US011179787B2

(12) United States Patent
Yoshida et al.

(10) Patent No.: US 11,179,787 B2
(45) Date of Patent: Nov. 23, 2021

(54) BATTERY ADAPTER FOR A CUTTING POWER TOOL

(71) Applicant: MAKITA CORPORATION, Anjo (JP)

(72) Inventors: Yuto Yoshida, Anjo (JP); Goh Yamamura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 9 days.

(21) Appl. No.: 16/560,511

(22) Filed: Sep. 4, 2019

(65) Prior Publication Data

US 2020/0130077 A1 Apr. 30, 2020

(30) Foreign Application Priority Data

Oct. 30, 2018 (JP) .............................. JP2018-204184

(51) Int. Cl.
| | |
|---|---|
| *B23D 47/12* | (2006.01) |
| *B23D 45/14* | (2006.01) |
| *B27B 5/29* | (2006.01) |
| *B23D 45/04* | (2006.01) |
| *H01M 50/267* | (2021.01) |

(52) U.S. Cl.
CPC ........... *B23D 47/12* (2013.01); *B23D 45/042* (2013.01); *B23D 45/14* (2013.01); *B27B 5/29* (2013.01); *H01M 50/267* (2021.01)

(58) Field of Classification Search
CPC ...... B23D 47/12; B23D 45/042; B23D 45/14; B27B 5/29; H01M 2/1033
See application file for complete search history.

(56) References Cited

U.S. PATENT DOCUMENTS

| | | | | |
|---|---|---|---|---|
| 3,873,862 | A | * | 3/1975 | Butler .................. B23D 59/006 310/50 |
| 5,357,834 | A | | 10/1994 | Ito et al. |
| D616,817 | S | * | 6/2010 | Walker ........................ D13/119 |
| 9,660,497 | B2 | * | 5/2017 | Ladd ..................... F04D 13/068 |
| 2002/0089306 | A1 | * | 7/2002 | Kubale ................. H02J 7/0044 320/112 |
| 2003/0163924 | A1 | * | 9/2003 | Hempe .................. H02K 7/145 30/388 |
| 2006/0028170 | A1 | * | 2/2006 | Izawa ............... H01M 10/6557 320/107 |
| 2007/0141459 | A1 | * | 6/2007 | Goto ..................... H01M 2/206 429/159 |

(Continued)

FOREIGN PATENT DOCUMENTS

| | | |
|---|---|---|
| JP | 2010-280013 A | 12/2010 |
| JP | 2014-161970 A | 9/2014 |

(Continued)

*Primary Examiner* — Ghassem Alie
*Assistant Examiner* — Fernando A Ayala
(74) *Attorney, Agent, or Firm* — Oliff PLC

(57) ABSTRACT

A cutting machine reduces cost increase associated with production equipment and has design flexibility for different types of batteries. A cutting machine for cutting a workpiece includes a cutting machine body including a cutting blade, a motor that drives the cutting blade, and a motor housing accommodating the motor, and an adapter including a body holder attached to the cutting machine body and a battery holder in which a battery to power the motor is installable.

20 Claims, 36 Drawing Sheets

(56) References Cited

U.S. PATENT DOCUMENTS

| | | | |
|---|---|---|---|
| 2008/0311795 A1* | 12/2008 | Brotto | H01M 2/1022 439/628 |
| 2009/0071017 A1* | 3/2009 | Gehret | B23D 45/16 30/391 |
| 2011/0214303 A1* | 9/2011 | Inayoshi | B27G 19/04 30/374 |
| 2013/0051104 A1* | 2/2013 | Nakano | H02H 7/18 363/131 |
| 2013/0130552 A1* | 5/2013 | Ota | H01M 10/425 439/620.21 |
| 2014/0215839 A1* | 8/2014 | Abe | B23Q 11/126 30/388 |
| 2017/0120435 A1* | 5/2017 | Palich | B25F 5/008 |
| 2018/0029146 A1 | 2/2018 | Hart | |
| 2018/0184834 A1* | 7/2018 | Brady, Jr. | H01M 10/052 |
| 2018/0234034 A1* | 8/2018 | Manasseh | H02P 3/12 |
| 2018/0331402 A1* | 11/2018 | Inoue | H01M 2/1094 |
| 2018/0361562 A1* | 12/2018 | Baxivanelis | B23D 45/16 |
| 2020/0130077 A1* | 4/2020 | Yoshida | H01M 2/1027 |
| 2020/0130080 A1* | 4/2020 | Miwa | B23D 45/024 |

FOREIGN PATENT DOCUMENTS

| | | | | |
|---|---|---|---|---|
| JP | 2017-213655 A | 12/2017 | | |
| WO | WO-2020019687 A1 * | 1/2020 | | H01M 2/10 |

\* cited by examiner

BATTERY ADAPTER FOR A CUTTING POWER TOOL

CROSS-REFERENCE TO RELATED APPLICATIONS

This application claims the benefit of priority to Japanese Patent Application No. 2018-204184, filed on Oct. 30, 2018, the entire contents of which are hereby incorporated by reference.

BACKGROUND

1. Technical Field

The present invention relates to a cutting machine, referred to as a sliding circular saw or a portable circular saw, mainly used for cutting wood.

2. Description of the Background

A cutting machine described in Japanese Unexamined Patent Application Publication No. 2017-213655 (hereafter, Patent Literature 1) includes a cutting machine body integrating a motor housing, a handle, and a battery holder. The motor housing accommodates a motor for driving a cutting blade. The handle is loop-shaped and thus grippable by a user. A battery to power the motor is removably installed in the battery holder. The cutting machine body is moved by operating the handle, with the cutting blade being driven by the motor. The cutting blade can thus cut a workpiece.

The battery holder in Patent Literature 1 is part of a handle housing forming the handle. In contrast, a battery holder described in U.S. Patent Application Publication No. 2018/0029146 (hereafter, Patent Literature 2) is part of a motor housing. However, cutting machines of similar types may use batteries with different voltages or capacities. For example, some cutting machines may use batteries with an output of 18 V, but others may use batteries with an output of 36 V. These batteries have different sizes or shapes. Cutting machines with such different batteries use different molds for their handles or motor housings, thus increasing the cost for production equipment.

BRIEF SUMMARY

One or more aspects of the present invention are directed to a cutting machine with design flexibility for different types of batteries to reduce cost increase associated with production equipment.

One aspect of the present invention provides a cutting machine for cutting a workpiece, including:
a cutting machine body including
a cutting blade,
a motor configured to drive the cutting blade, and
a motor housing accommodating the motor; and
an adapter including
a body holder attached to the cutting machine body, and
a battery holder in which a battery to power the motor is installable.

Another aspect of the present invention provides a stationary tool placeable for use on a table or a floor, the stationary tool including:
a base placeable on the table or the floor;
a tool body supported on the base; and
an adapter attached to the tool body, the adapter including
a body holder attached to the tool body, and
a battery holder in which a battery to power the motor is installable.

The cutting machine according to each of the aspects of the present invention reduces cost increase associated with production equipment and has design flexibility for different types of batteries.

BRIEF DESCRIPTION OF DRAWINGS

FIG. 12 is a cross-sectional view taken along line XII-XII in FIG. 4 with a positive locking mechanism turned on.

DETAILED DESCRIPTION

Figure 1:
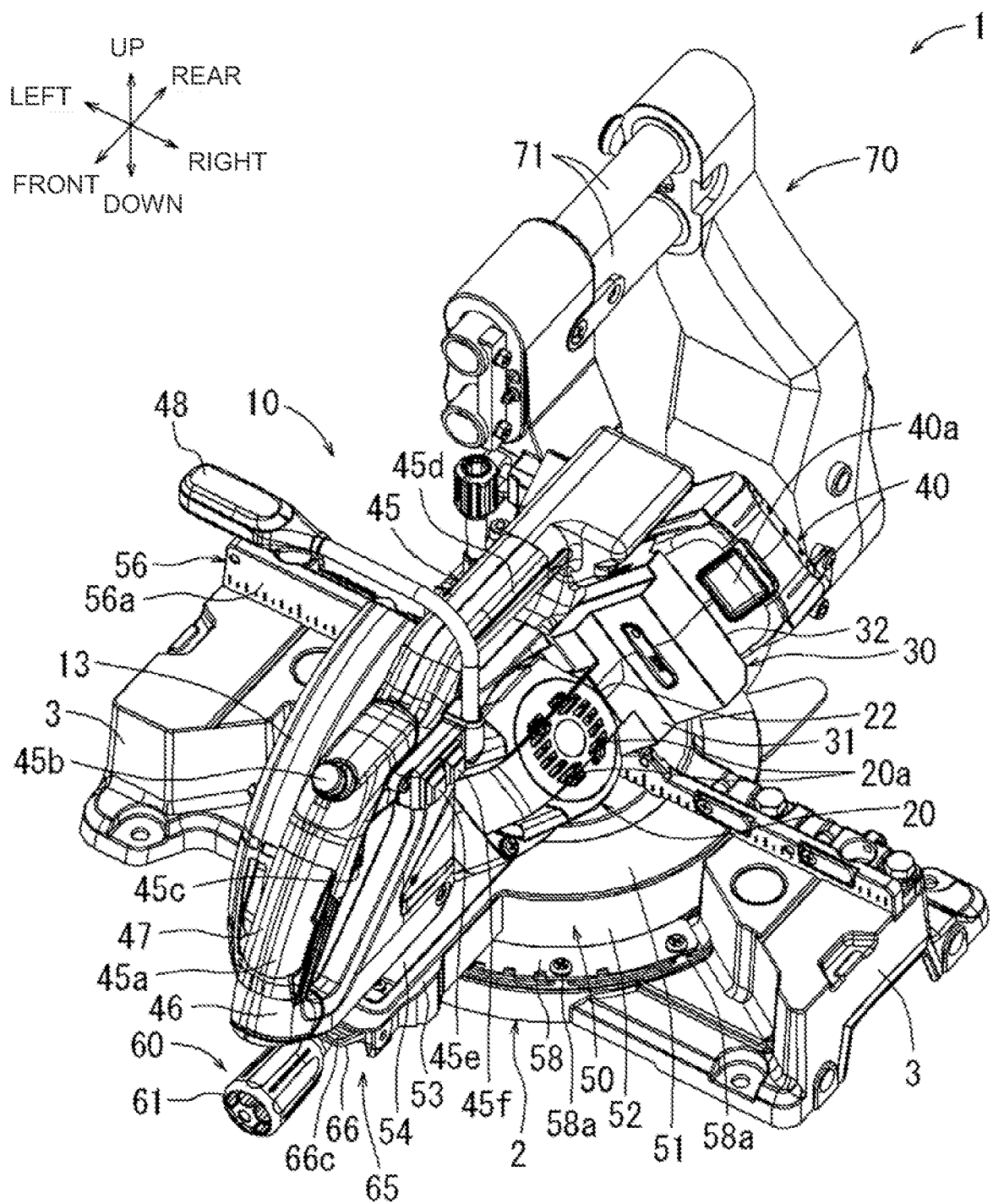
FIG. 1 is an overall perspective view of a cutting machine.

A cutting machine 1 will now be described with reference to FIGS. 1 to 37. The cutting machine (stationary tool) 1 according to the present embodiment is a sliding circular saw. As shown in FIG. 1, the cutting machine 1 includes a cutting machine body 10, a turntable 50 on which a workpiece is placeable, and a base 2. The base 2 is placed on a surface such as a table or a floor to support the turntable 50 in a manner rotatable horizontally. The base 2 includes auxiliary tables 3 on both the right and the left of the turntable 50. The auxiliary tables 3 have the same height at their upper surfaces as the turntable 50.

For components and structures described below, the directional terms such as up, down, right, and left are defined as seen from a user. The front and the rear of the members and components are defined as the front being closer to the user.

Figure 2:
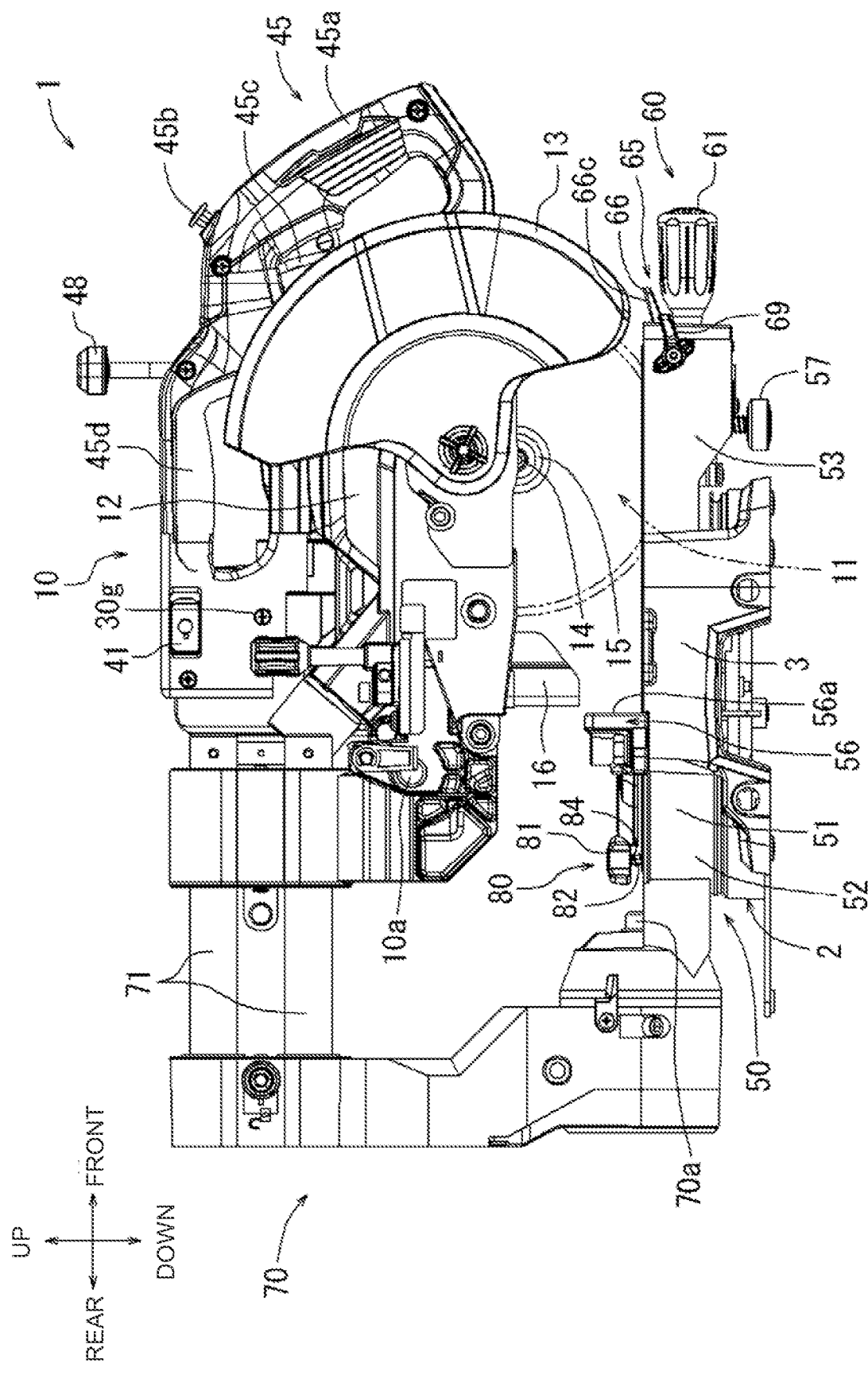
FIG. 2 is a left side view of the cutting machine.
Figure 8:
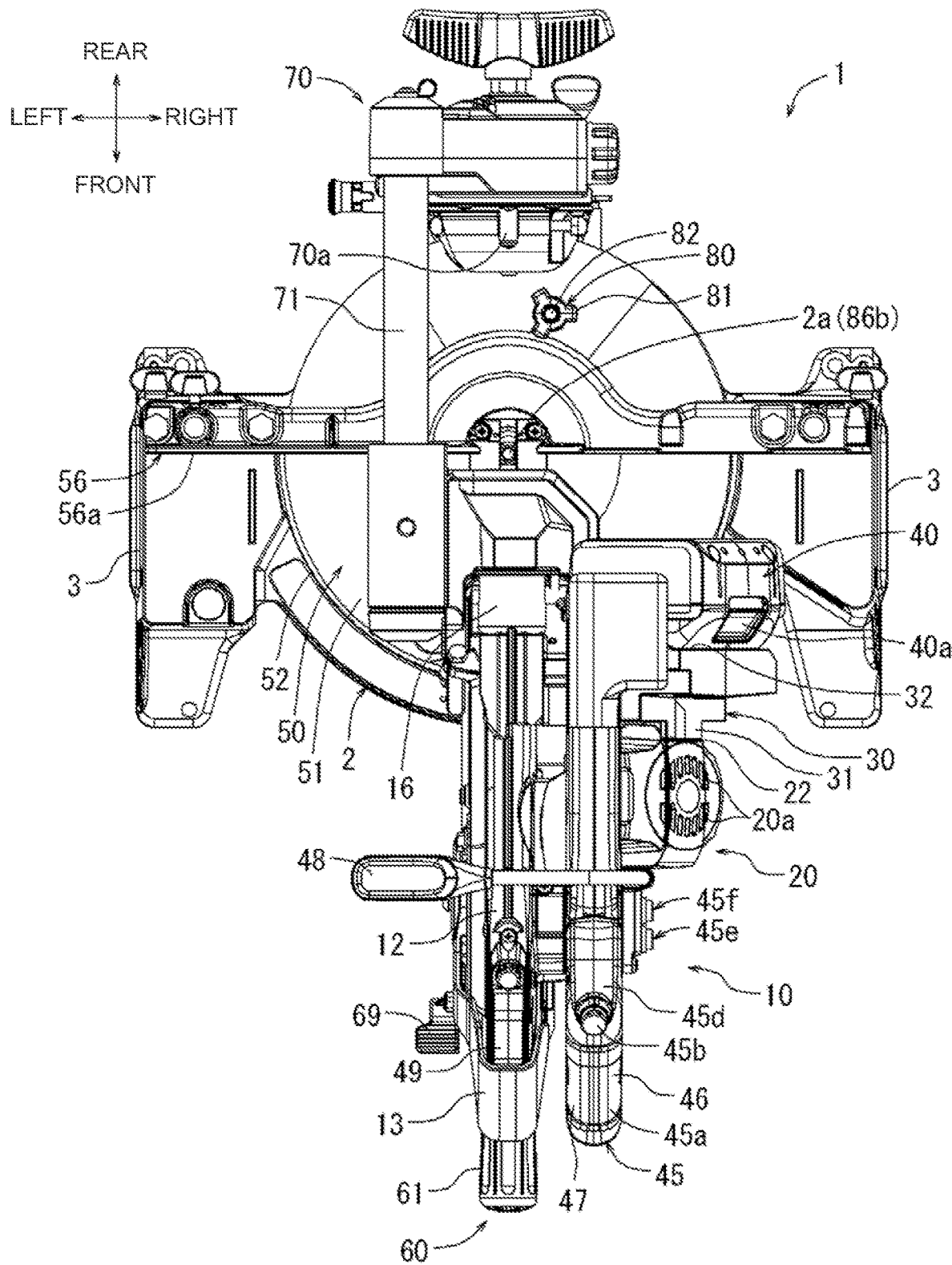
FIG. 8 is a plan view of the cutting machine with the cutting machine body slid forward.
Figure 9:
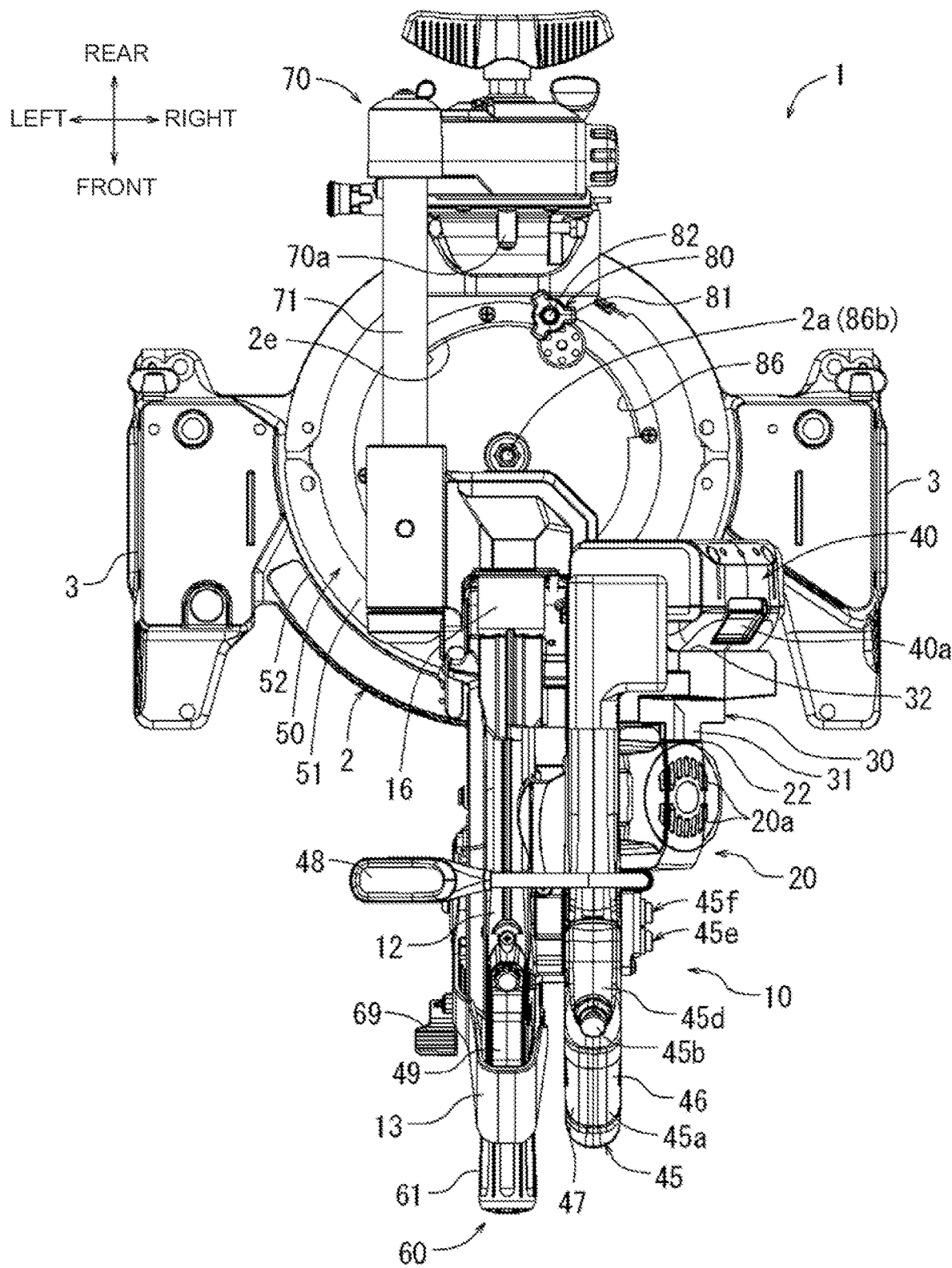
FIG. 9 is a plan view of the cutting machine with a turntable removed.
Figure 10:
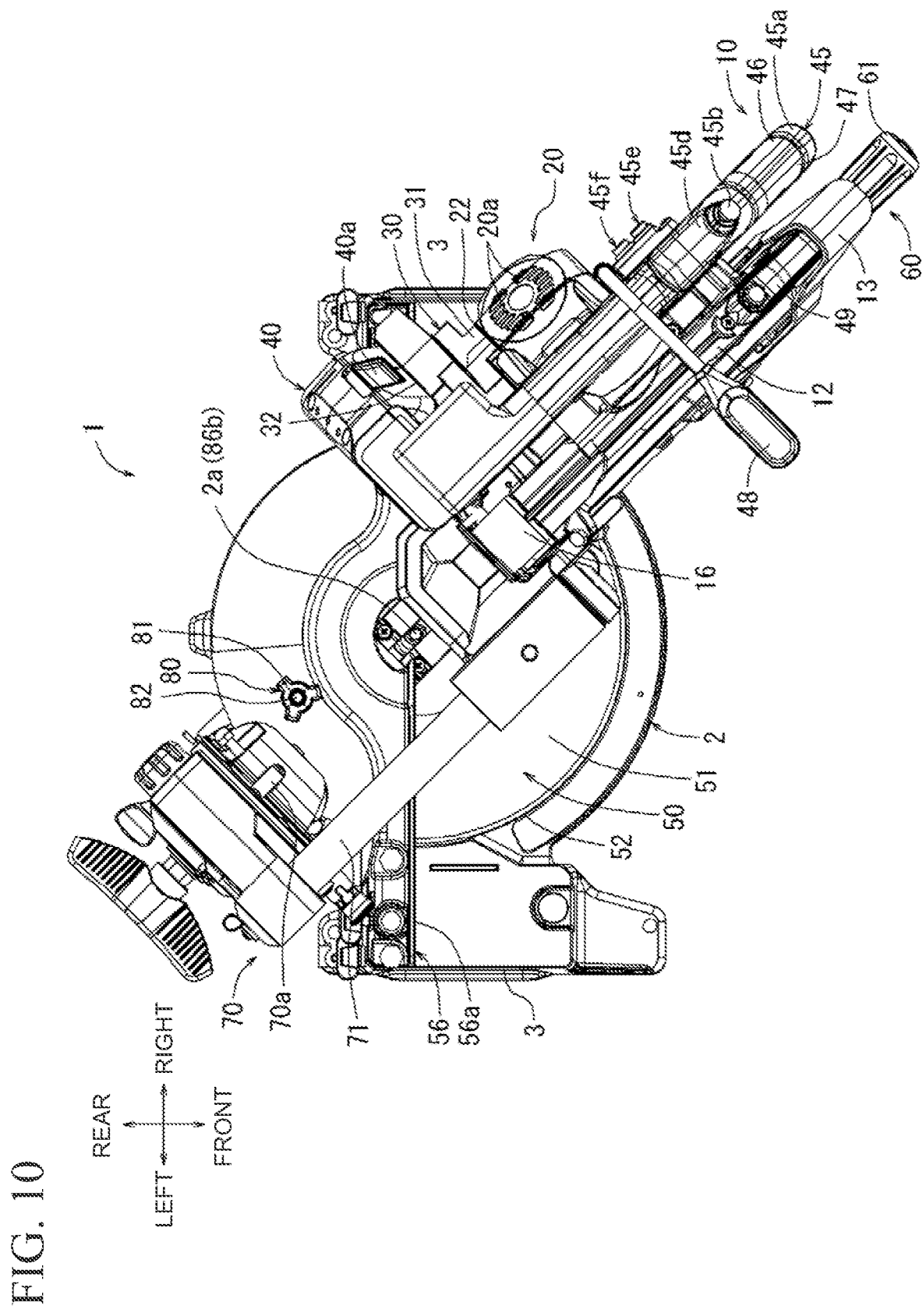
FIG. 10 is a plan view of the cutting machine with a maximum miter angle in the right direction.
Figure 11:
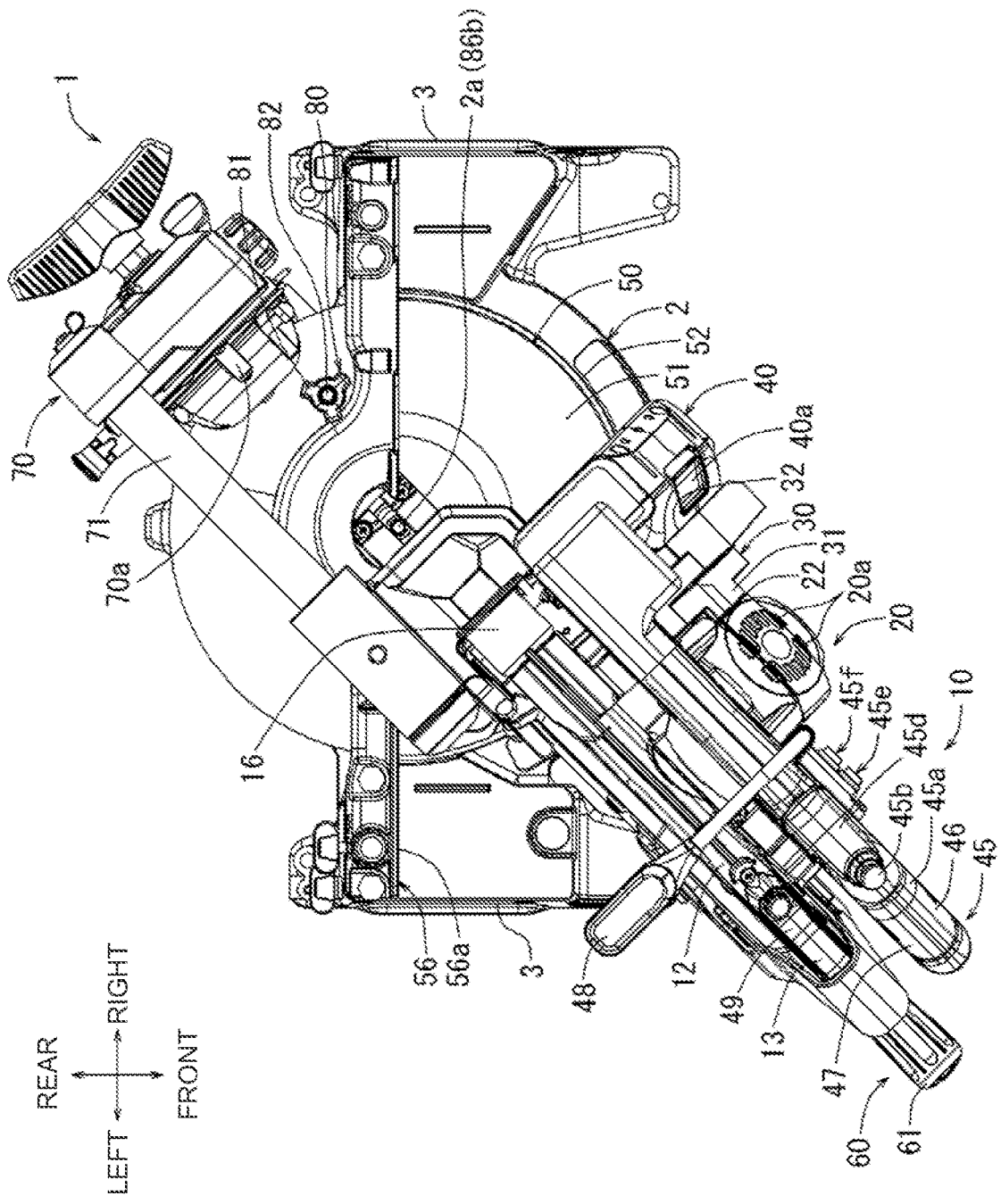
FIG. 11 is a plan view of the cutting machine with a maximum miter angle in the left direction.

As shown in FIGS. 10 and 11, the turntable 50 is supported in a manner rotatable horizontally with respect to the base 2 with a rotation support shaft 2a located in the middle of the upper surface of the base 2. As shown in FIGS. 2 and 8, the turntable 50 includes a table body 51, an outer peripheral table wall 52, and a table extension 53. The table body 51 is substantially circular in a plan view, and has its upper surface arranged horizontally. The outer peripheral table wall 52 is substantially cylindrical, and is located on the outer edge of the table body 51. The table extension 53 extends forward from the table body 51. As shown in FIG. 1, the table body 51 has, on its upper surface, a throat plate 54 and a positioning fence 56. The positioning fence 56 positions the workpiece in a surface direction.

Figure 12:
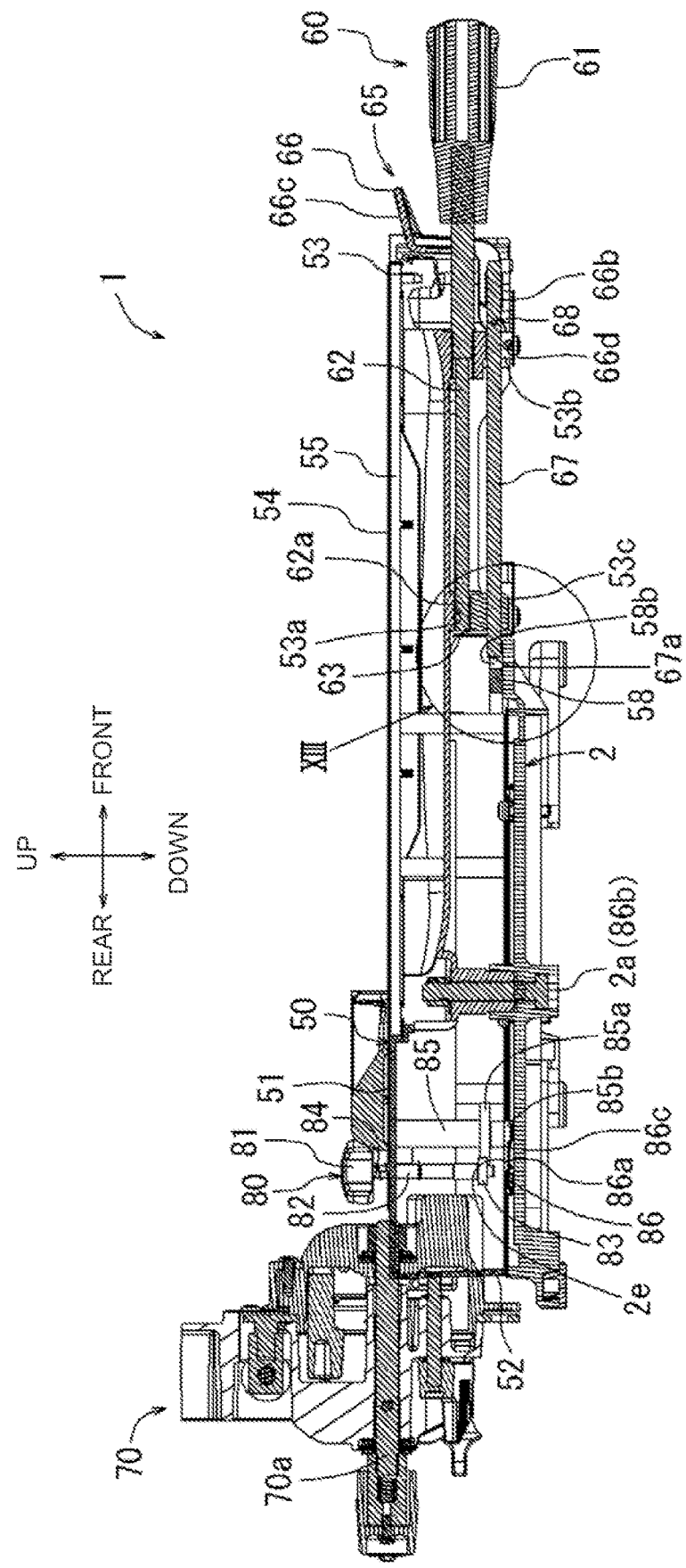

The throat plate 54 is a single plate before having a slot. As shown in FIG. 12, the throat plate 54 in use has a cutout slot 55, which is formed by cutting using a cutting blade 11. The slot 55 indicates an actual accurate position of the cutting blade 11.

As shown in FIG. 12, a table positioning mechanism 60 (first positioning mechanism) and a positive locking mechanism 65 (second positioning mechanism) are located below the table extension 53. The table positioning mechanism 60 includes a fixing rod 62 and a grip 61. The fixing rod 62 is located inside the table extension 53 and extends in the longitudinal direction of the table extension 53. The grip 61 protrudes further forward from a front end of the table extension 53. The grip 61 is integral with a front end of the fixing rod 62.

Figure 13:
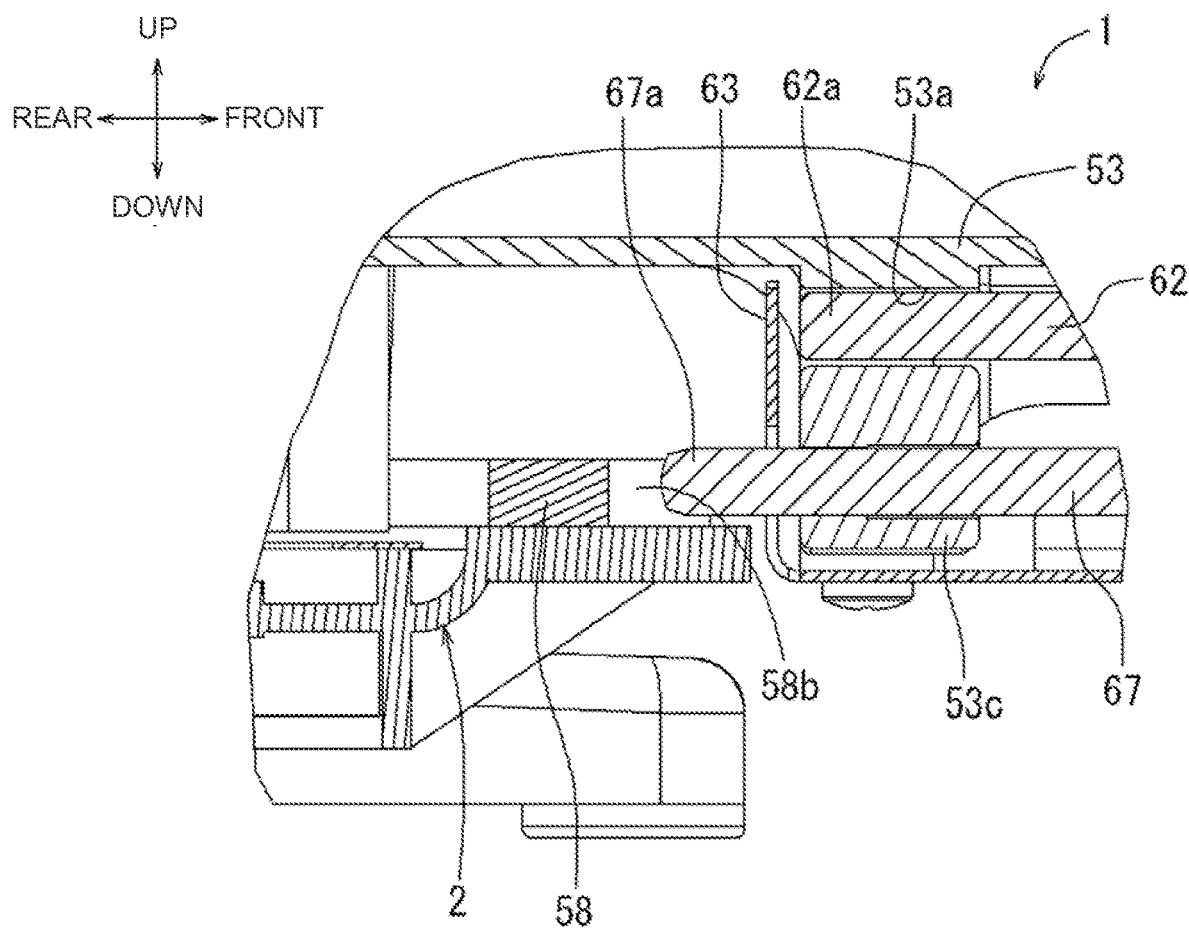
FIG. 13 is an enlarged partial view of area XIII in FIG. 12.

As shown in FIGS. 12 and 13, a threaded shaft part 62a is located on a rear end of the fixing rod 62. The threaded shaft part 62a is screwed into a screw hole 53a formed in the table extension 53. The screw hole 53a extends in the front-rear direction in a rear support 53c located in a lower rear portion of the table extension 53. The fixing rod 62 moves toward the base 2 in the longitudinal direction of the table extension 53 when the user grips and rotates the grip 61 about the axis of the fixing rod 62 in a screw tightening direction. In contrast, the fixing rod 62 moves away from the base 2 in the longitudinal direction of the table extension 53 when the user grips and rotates the grip 61 about the axis of the fixing rod 62 in a screw loosening direction.

As shown in FIGS. 12 and 13, a protection plate 63 extends both vertically and horizontally behind the rear end of the fixing rod 62. The protection plate 63 is placed between the rear end of the fixing rod 62 and a front wall of the base 2 (not shown). The protection plate 63 is fixed to a basal end of the table extension 53. The rear end of the fixing rod 62 abuts against the protection plate 63 when the grip 61 is rotated in the screw tightening direction. The protection plate 63 is then pressed against the front wall of the base 2 as pushed by the rear end of the fixing rod 62. This fixes the table extension 53 to the base 2, locking the turntable 50 to prevent rotation with respect to the base 2. In this manner, the turntable 50 is locked against the base 2 at a predetermined rotation angle.

Figure 16:
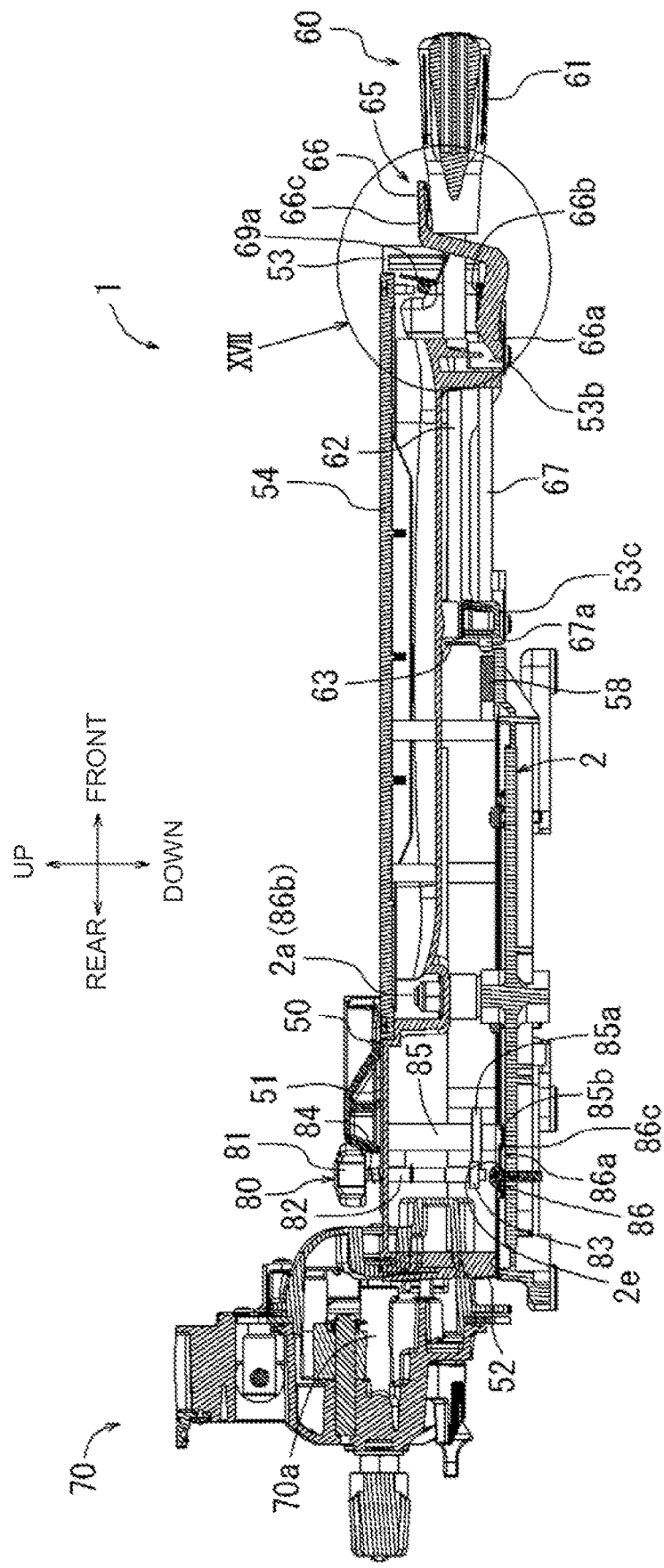
FIG. 16 is a cross-sectional view taken along line XVI-XVI in FIG. 4.

As shown in FIG. 12, the positive locking mechanism 65 includes an unlock lever 66 and a positioning pin 67. The unlock lever 66 is located at the front end of the table extension 53. The unlock lever 66 is substantially curved into an S-shape (a crank shape). The unlock lever 66 includes an operation part 66c protruding forward from above a middle portion of the unlock lever 66. The operation part 66c protrudes further forward from the front end of the table extension 53. As shown in FIG. 16, a rear end 66a is supported in a manner swingable in the vertical direction relative to the table extension 53 with a swing shaft 66d shown in FIG. 12.

As shown in FIGS. 12 and 16, the positioning pin 67 extends in the front-rear direction below the fixing rod 62. The unlock lever 66 cooperates with the positioning pin 67 in front of the swing shaft 66d with an engagement pin 68. The engagement pin 68 has a sufficiently smaller diameter than the positioning pin 67. The engagement pin 68 is placed through the positioning pin 67 in the lateral direction. The engagement pin 68 abuts against the rear end 66a from below. The positioning pin 67 is supported in a manner movable back and forth with a front support 53b and the rear support 53c of the table extension 53.

Figure 14:
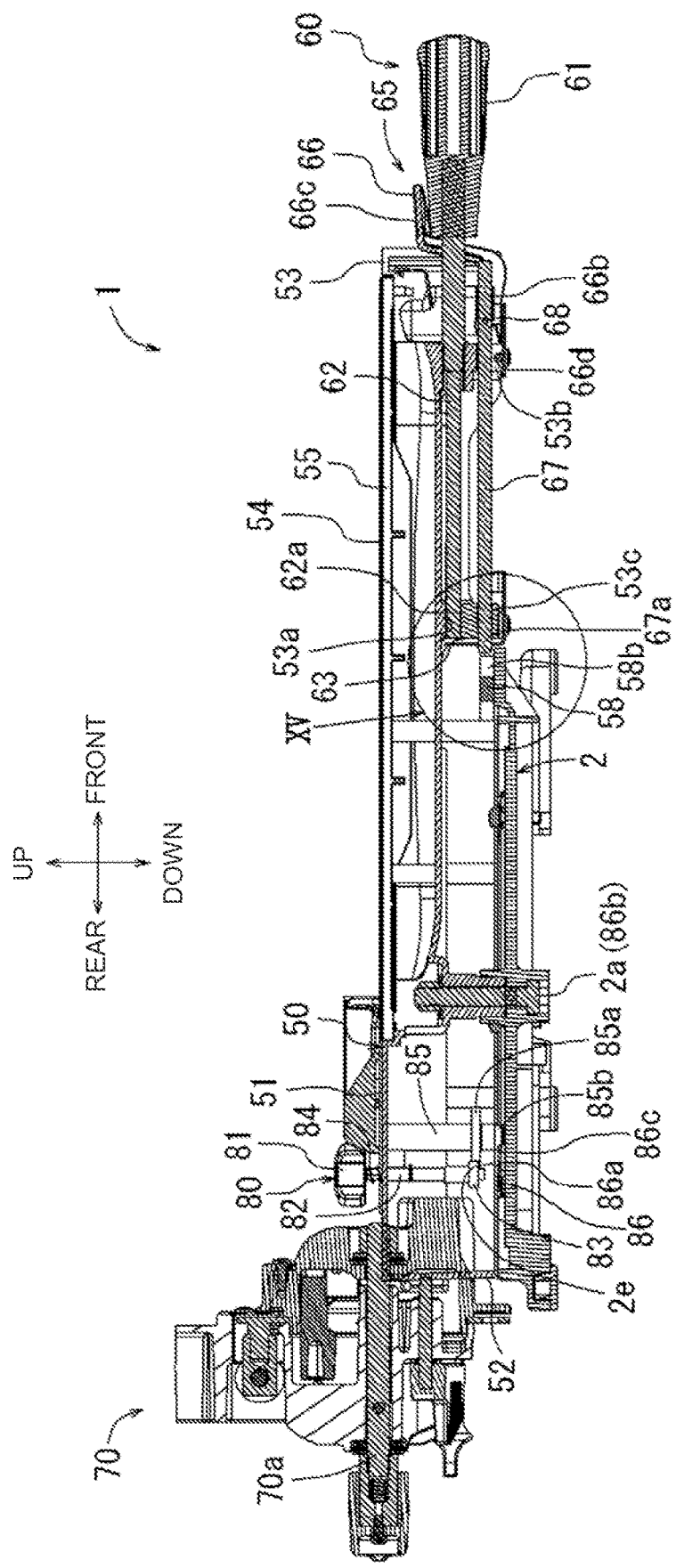
FIG. 14 is a cross-sectional view corresponding to FIG. 12 with the positive locking mechanism turned off.
Figure 15:
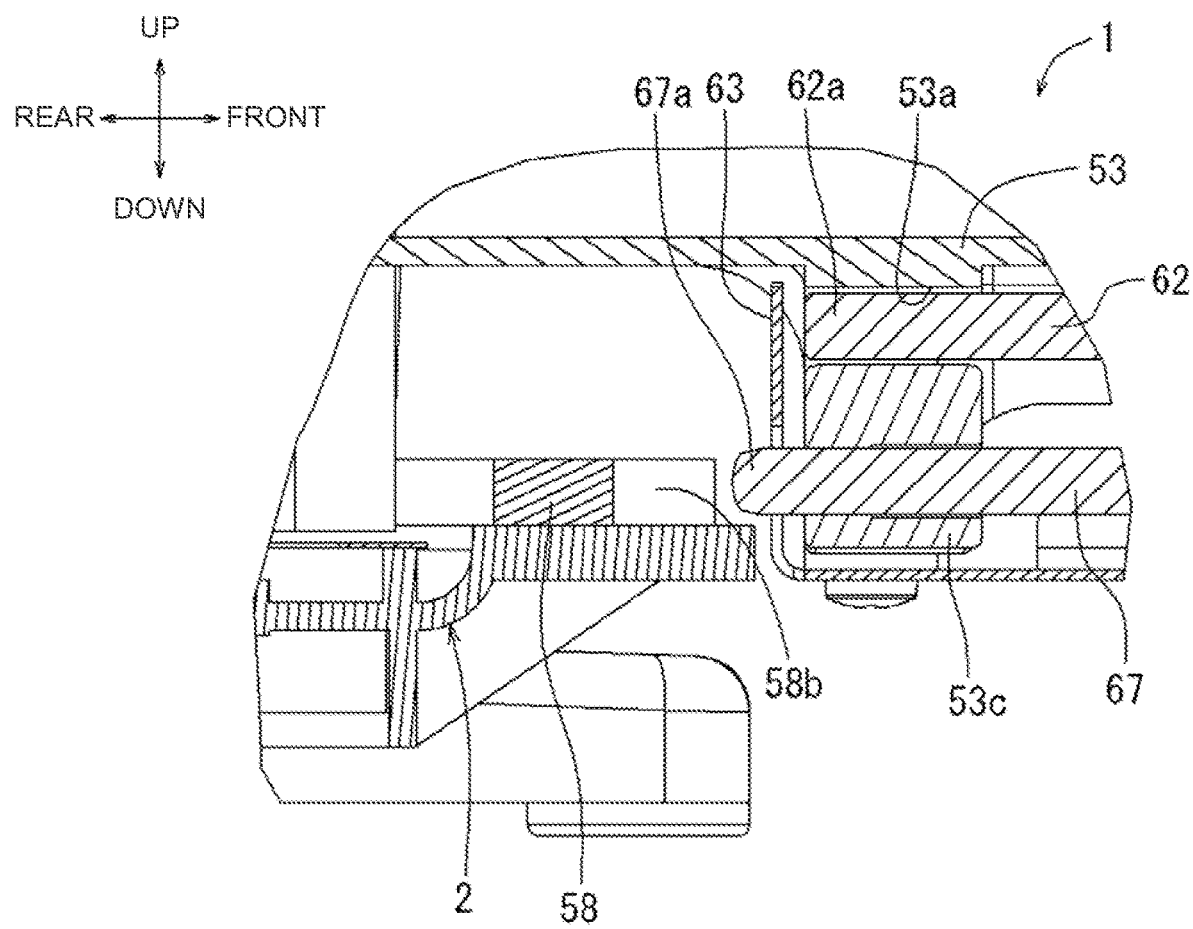
FIG. 15 is an enlarged partial view of area XV in FIG. 14.

As shown in FIG. 14, as the positioning pin 67 moves backward, the rear end 66a is pressed upward by the engagement pin 68. The unlock lever 66 thus swings upward about the swing shaft 66d. As shown in FIG. 12, the unlock lever 66 swings downward about the swing shaft 66d to press the engagement pin 68 downward with the rear end 66a. This moves the engagement pin 68 relatively forward along the lower surface of the rear end 66a, and thus moves the positioning pin 67 forward. The positioning pin 67 has a rear end 67a facing the front surface of a miter scale plate 58 mounted on an upper surface of a middle arc portion of the base 2. The front surface of the miter scale plate 58 has positioning recesses 58b facing the rear end 67a at the height to receive the rear end 67a. The miter scale plate 58 extends in an arc in the circumferential direction. The positioning recesses 58b are spaced at predetermined angular intervals in the circumferential direction of the miter scale plate 58.

Figure 17:
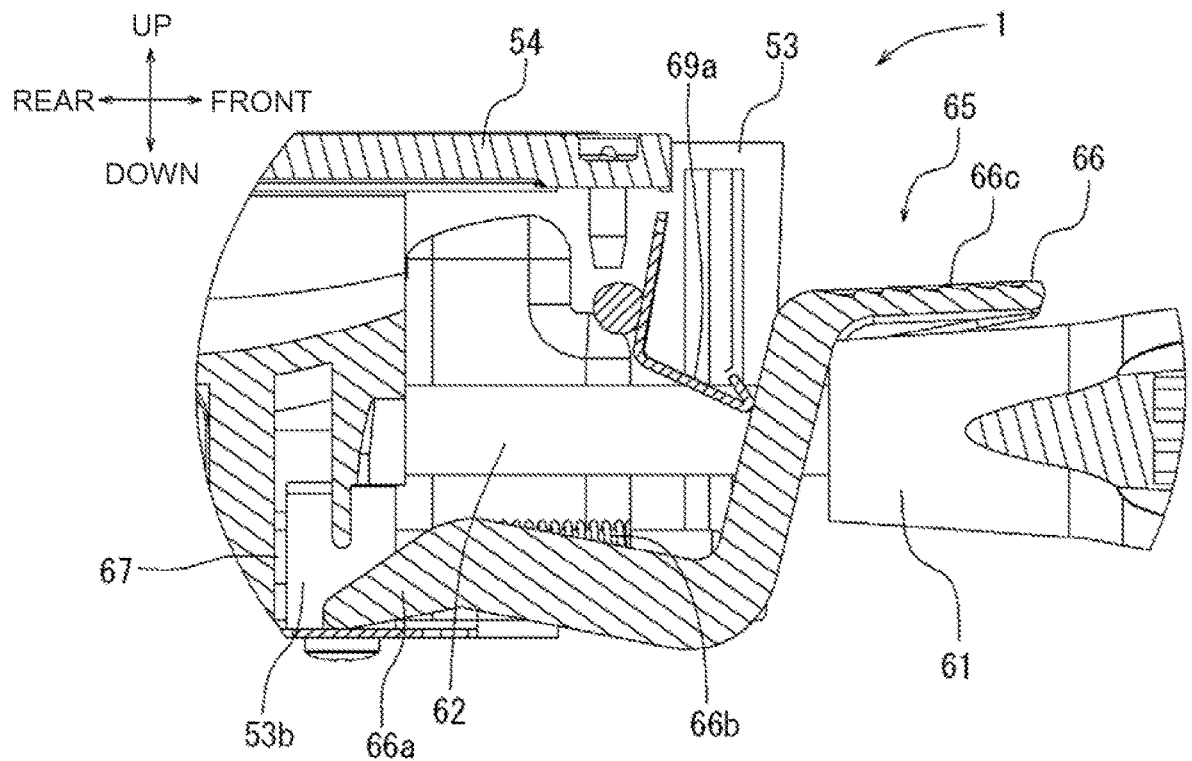
FIG. 17 is an enlarged partial view of area XVII in FIG. 16.

As shown in FIGS. 12 and 17, a compression spring 66b is attached to the positioning pin 67 at a position forward from the engagement pin 68. The compression spring 66b urges the positioning pin 67 backward. Thus, the unlock lever 66 is urged upward by the compression spring 66b with the engagement pin 68. As shown in FIG. 12, when the unlock lever 66 is at an upper position (lock position), the positioning pin 67 is moved backward under the urging force applied from the compression spring 66b. The rear end 67a of the positioning pin 67 thus enters one of the positioning recesses 58b. This locks the rotation of the turntable 50.

The positioning pin 67 is retained at the lock position under the urging force applied from the compression spring 66b.

As shown in FIG. 14, when the operation part 66c is depressed (to an unlock position) against the urging force applied from the compression spring 66b, the engagement pin 68 moves forward, and thus the positioning pin 67 also moves forward. The rear end 67a is thus pulled out of the positioning recess 58b. This unlocks the positive locking mechanism 65 to allow the turntable 50 to rotate. The turntable 50 may be rotated while the positive locking mechanism 65 is unlocked. The rear end 67a is then urged by the compression spring 66b and pressed against the miter scale plate 58. Once the turntable 50 rotates to a predetermined angle, the rear end 67a faces one of the positioning recesses 58b. The rear end 67a then readily enters the positioning recess 58b. This locks the turntable 50 at the rotating position at the predetermined angle.

As shown in FIG. 2, an operation knob 69 is located on the left of the front end of the table extension 53. The operation knob 69 retains the unlock lever 66 at a depressed position (unlock position). The unlock lever 66 is locked at the depressed position (unlocking operation) when the operation knob 69 is operated. As shown in FIG. 17, the unlock lever 66 is locked at the depressed position when a leaf spring 69a integral with the operation knob 69 interferes with the rear of the operation part 66c. While the unlock lever 66 is retained at the unlock position, the rear end 67a shown in FIG. 12 remains detached from the positioning recess 58b. This allows quick and reliable positioning with the table positioning mechanism 60. With no positioning performed with the table positioning mechanism 60, the unlock lever 66 is unlocked by disabling the locking operation of the operation knob 69. This moves the unlock lever 66 back to the lock position located above under the urging force applied from the compression spring 66b.

Figure 5:
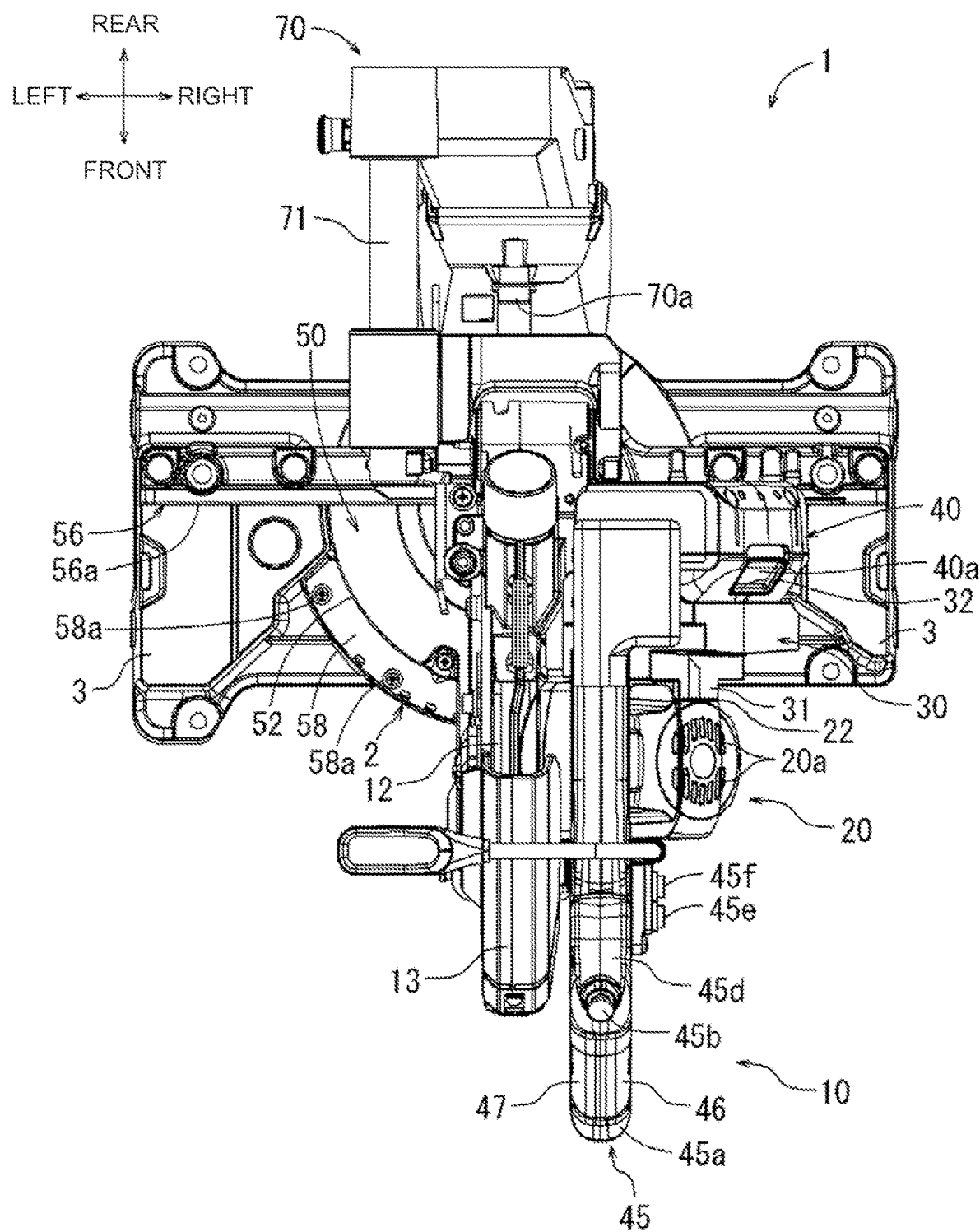
FIG. 5 is a plan view of the cutting machine.
Figure 7:
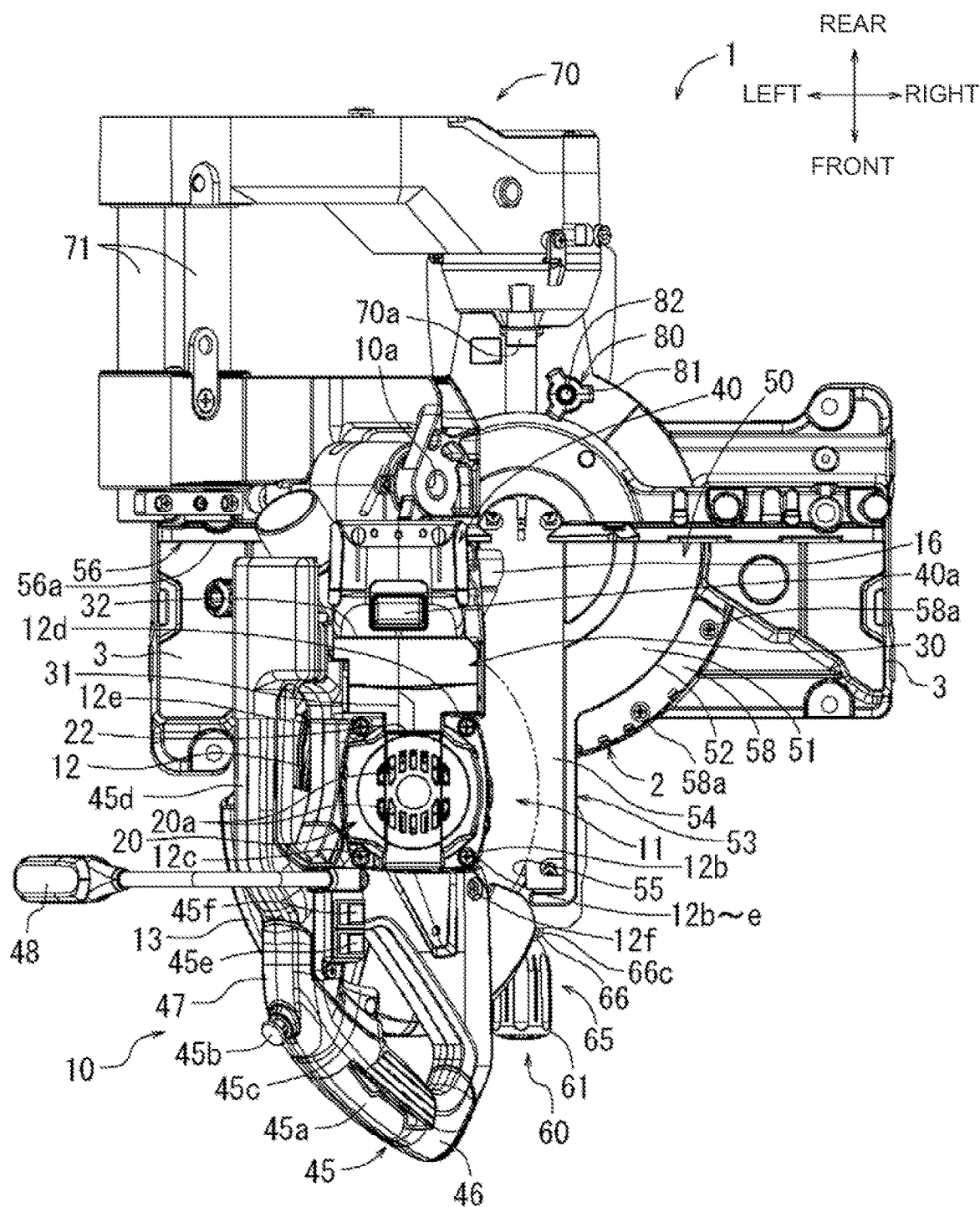
FIG. 7 is a plan view of the cutting machine with the cutting machine body tilted leftward.

As shown in FIGS. 5 and 7, the miter scale plate 58 having an arc shape is mounted in front of the base 2. The miter scale plate 58 is placed within substantially a front half area of the circumference of the base 2. The miter scale plate 58 has a substantially flat upper surface graduated to indicate the miter angle of the turntable 50. The miter scale plate 58 is fixed to the base 2 with fixing screws 58a. Each fixing screw 58a is inserted into a long hole. Loosening the fixing screw 58a and moving the miter scale plate 58 in the lateral direction finely adjusts the angles of the positioning fence 56 and the cutting blade 11. For example, when the positioning pin 67 is inserted into a positioning recess 58b at right angles, the cutting blade 11 and the positioning fence 56 are finely adjusted at right angles. This adjustment is performed mainly in production processes.

As shown in FIG. 2, an adjustment bolt 57 is located at a lower end of the table extension 53 to support the table extension 53 from below. The adjustment bolt 57 is movable in the vertical direction by screwing. When loosened, the adjustment bolt 57 moves downward. The adjustment bolt 57 has a lower end that abuts against the mounting surface for the cutting machine 1 to support the table extension 53 at an adjustable height.

Figure 4:
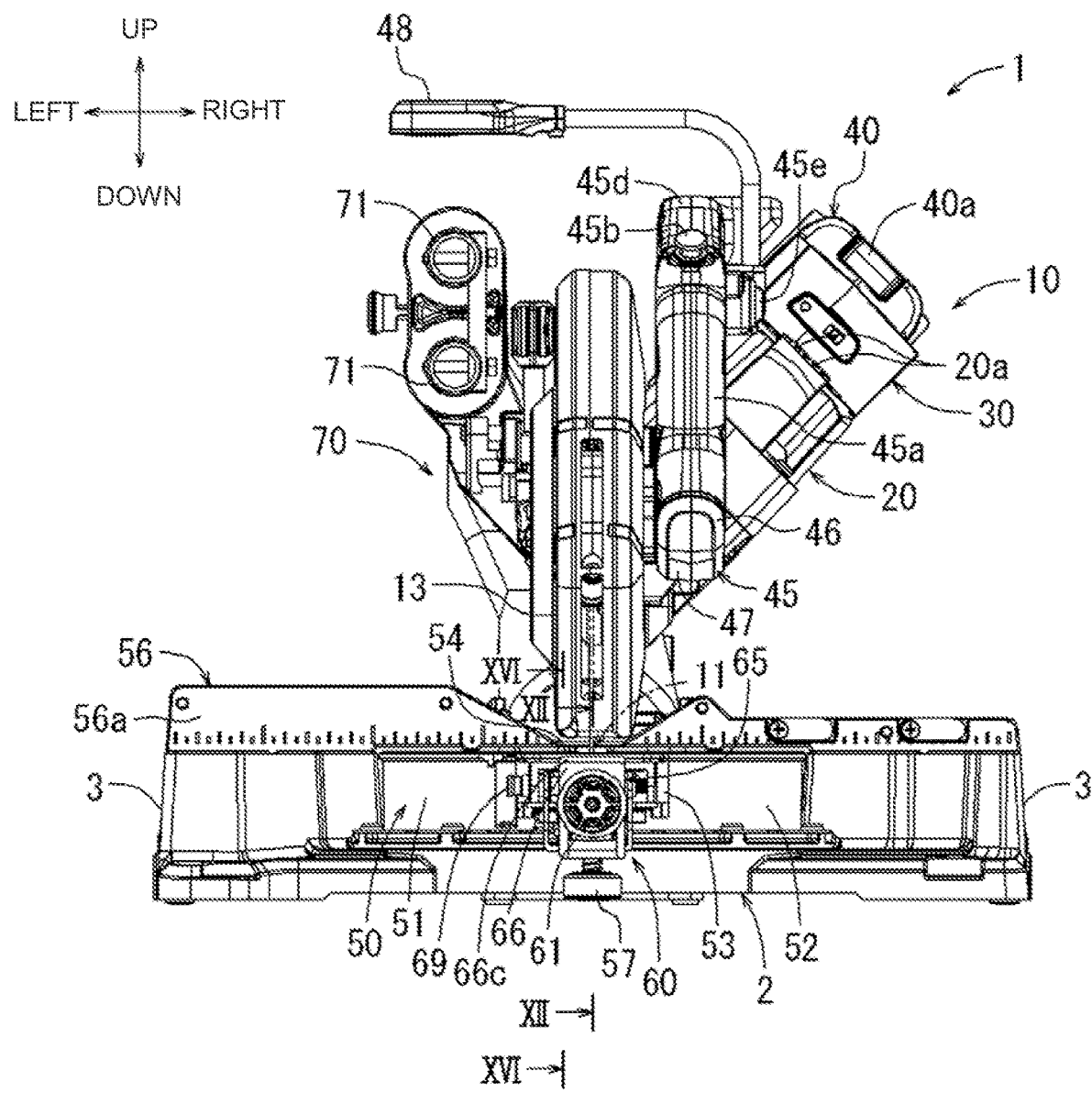
FIG. 4 is a front view of the cutting machine.

As shown in FIGS. 4 and 12, the positioning fence 56 is a wall that extends in the lateral direction and also upward.

Figure 6:
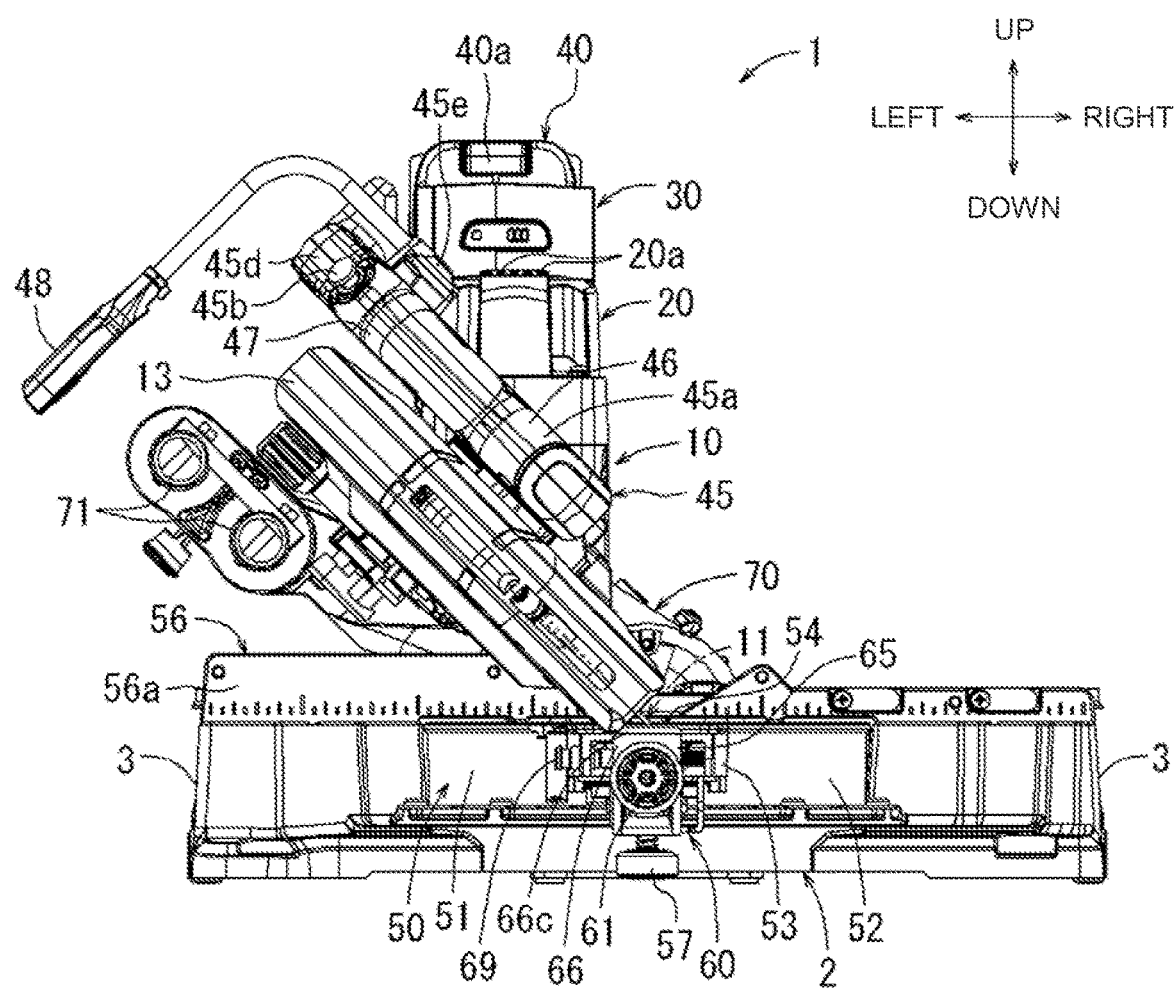
FIG. 6 is a front view of the cutting machine with a cutting machine body tilted leftward.

A body support 70 is located behind the turntable 50. The body support 70 supports the cutting machine body 10 in a swingable manner. The body support 70 has a lateral tilt support shaft 70a extending in the front-rear direction behind the turntable 50. As shown in FIGS. 6 and 7, the cutting machine body 10 is tiltable in the lateral direction about the lateral tilt support shaft 70a. A slide bar 71 is located between the body support 70 and the cutting machine body 10. As shown in FIGS. 5 and 8, the cutting machine body 10 is slidable in the front-rear direction along the slide bar 71.

As shown in FIG. 2, the cutting machine body 10 has, in its rear portion, a vertical swing support shaft 10a, which is elongated in the lateral direction. The cutting machine body 10 is vertically swingable about the vertical swing support shaft 10a. The cutting machine body 10 is swung downward to allow the cutting blade 11 to cut a workpiece placed on the turntable 50. The cutting machine body 10 is then slid forward. This allows the cutting blade 11 to cut a workpiece, for example, a wide workpiece.

As shown in FIG. 2, the cutting machine body 10 includes a stationary cover 12 and a movable cover 13. The stationary cover (cutting blade cover) 12 covers an upper half of the cutting blade 11. The stationary cover 12 is formed from a metal material, such as aluminum. The movable cover 13 covers a lower half of the cutting blade 11. The movable cover 13 rotates in cooperation with a vertical motion of the cutting machine body 10, and opens and closes the lower half of the cutting blade 11. During cutting, the movable cover 13 moves to an open position, thus uncovering the cutting blade 11 for cutting a workpiece.

Figure 3:
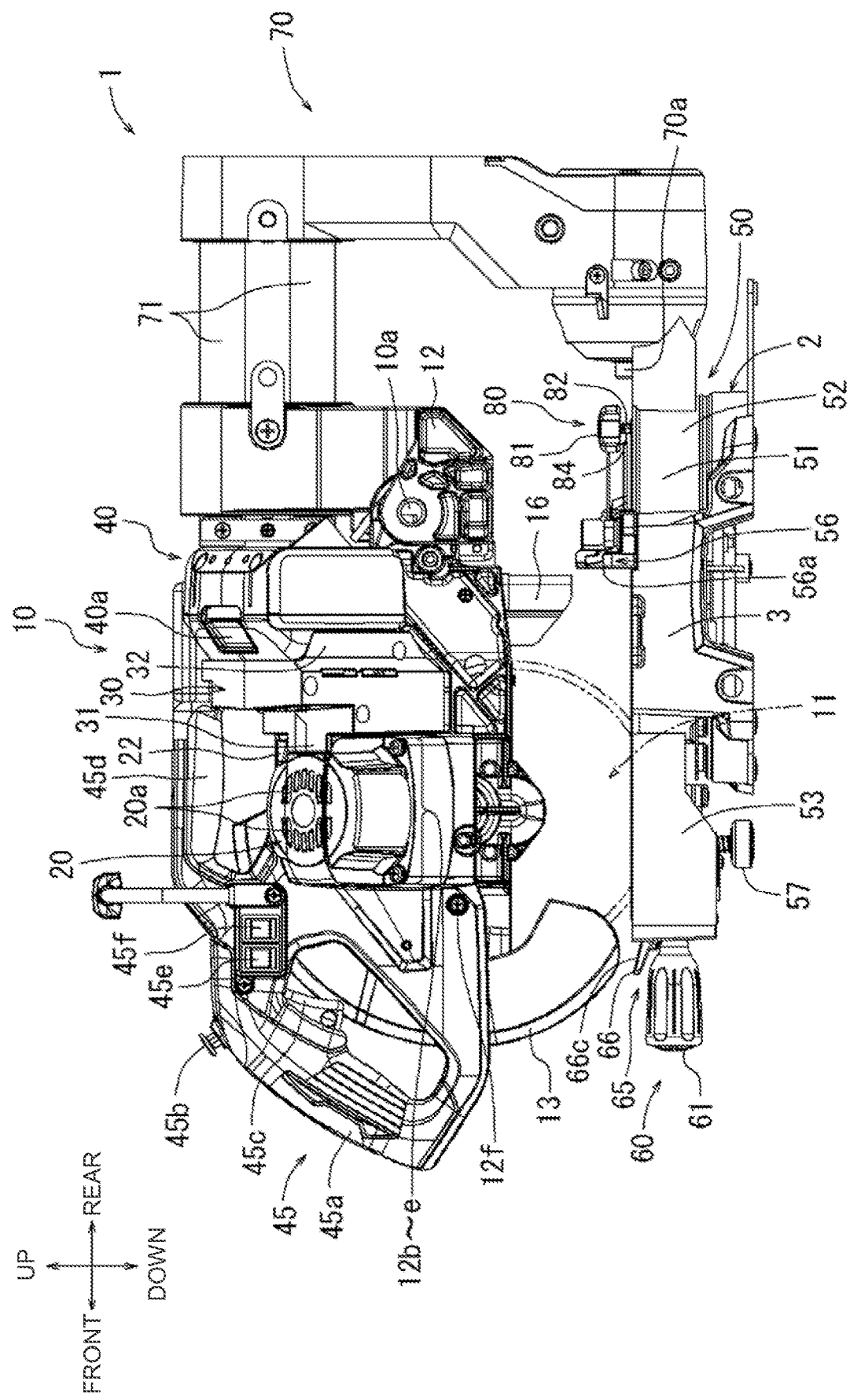
FIG. 3 is a right side view of the cutting machine.

As shown in FIGS. 3 and 4, the cutting machine body 10 includes a motor housing 20 and a handle 45. The handle 45 has a half-split structure dividable into a right handle part 46 and a left handle part 47. The right handle part 46 and the left handle part 47 are horizontally symmetrical. The handle 45 includes a front main handle 45a and a rear carrying handle 45d. The main handle 45a and the carrying handle 45d are loop-shaped and thus grippable by the user. The main handle 45a is gripped by the user in a cutting operation. The main handle 45a includes a switch lever 45c on its inner periphery. The switch lever 45c is positioned to be pullable by a finger of the user gripping the main handle 45a. Pulling the switch lever 45c starts a motor 25 and thus rotates the cutting blade 11.

As shown in FIGS. 3 and 4, the main handle 45a includes a lock-off button 45b on its upper surface. The lock-off button 45b is pressed to allow an operation of the switch lever 45c. This structure prevents the motor 25 from starting unexpectedly.

As shown in FIG. 3, the carrying handle 45d is gripped by the user for carrying the cutting machine 1. When the cutting machine body 10 is located at the lower end, the carrying handle 45d extends substantially horizontally. With the cutting machine body 10 locked at the lower end, the user grips the carrying handle 45d to carry the cutting machine 1.

As shown in FIG. 3, the handle 45 includes switches 45e and 45f. Pressing the switch 45e turns on or off a laser illuminator 49 emitting laser light for guideline alignment. The laser light is illuminated on a cut surface and serves as a reference line along which the cutting blade 11 is moved. Pressing the switch 45f turns on or off an illuminator 48 emitting illumination light. The illumination light illuminates a cutting area to be cut by the cutting blade 11. The illuminator 48 includes an arm extending from the handle 45, and is located above the cutting machine body 10.

As shown in FIG. 2, the carrying handle 45d receives a communication adapter 41 at its rear. The communication adapter 41 is electrically connected to a controller 35 shown in FIG. 32. The communication adapter 41 wirelessly communicates with other attachments. The attachments include a dust collector for sucking chips. The attachments communicating wirelessly can be activated or deactivated in cooperation with a start or stop operation of the cutting machine 1.

Figure 32:
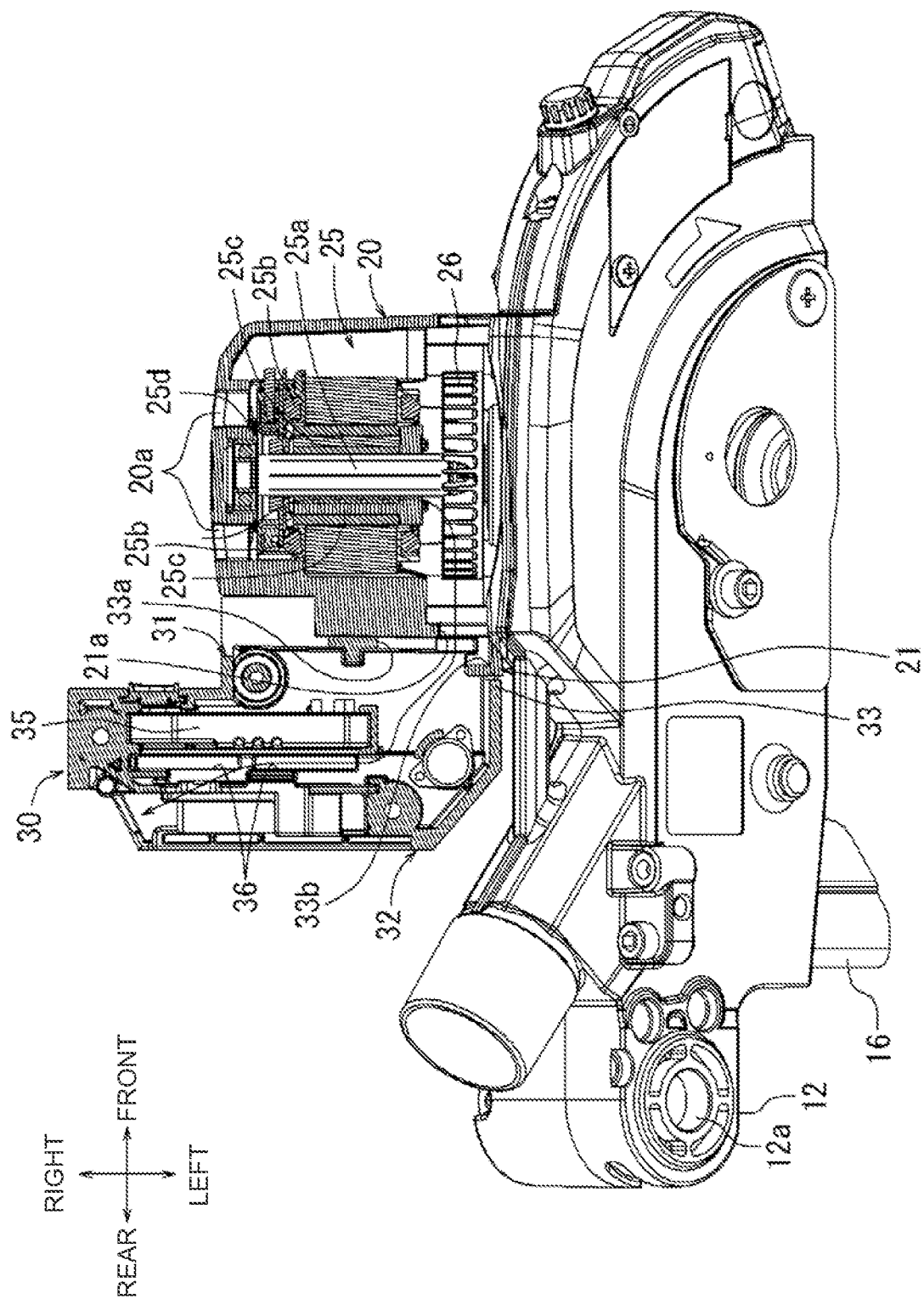
FIG. 32 is a cross-sectional view taken along line XXXII-XXXII in FIG. 31.

As shown in FIG. 4, the motor housing 20 is substantially cylindrical, and is tilted right upward with respect to the stationary cover 12. The motor housing 20 has an inlet 20a on its upper right. As shown in FIG. 32, the motor housing 20 accommodates the motor 25. The motor 25 includes a motor shaft 25a extending in the axial direction of the substantially cylindrical motor housing 20. The motor shaft 25a receives a motor fan 26 on its lower left opposite to the inlet 20a. When the motor 25 rotates the motor fan 26, outside air is drawn into the motor housing 20 through the inlet 20a.

As shown in FIG. 32, the motor 25 may be a direct current (DC) brushless motor. The motor 25 includes a stator 25b supported on the inner peripheral surface of the motor housing 20 in a nonrotatable manner. The motor 25 includes a rotor 25c located inward from the inner peripheral surface of the stator 25b. The rotor 25c is mounted on the motor shaft 25a, and is rotatably supported together with the motor shaft 25a with respect to the motor housing 20. The rotation angle of the rotor 25c is detected by a sensor board 25d.

As shown in FIG. 4, the motor housing 20 is not parallel but is tilted with respect to the upper surface of the turntable 50 when the cutting blade 11 is at a perpendicular cutting position orthogonal to the upper surface of the turntable 50. Thus, the tilt angle (bevel angle) of the cutting machine body 10 toward the right of the motor housing 20 can be set larger. For example, the cutting machine body 10 can be tilted by a greater degree than when the motor housing 20 is located parallel to the upper surface of the turntable 50.

As shown in FIG. 2, the cutting blade 11 with the center held between an outer flange 15 and an inner flange (not shown) is attached to a spindle (not shown) with a fixing screw 14 being screwed. The cutting blade 11 is thus supported by the stationary cover 12 in a manner rotatable with the spindle. The spindle, to which the cutting blade 11 is attached, is rotatable together with the rotation of the motor shaft 25a shown in FIG. 32 transmitted through a reduction gear.

Figure 18:
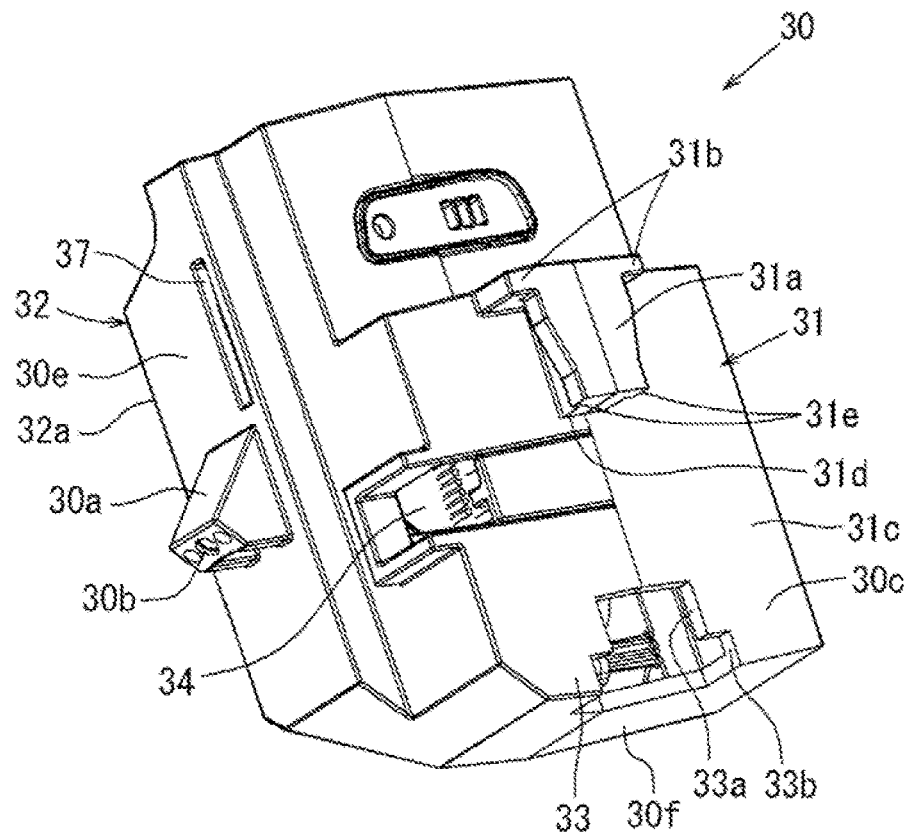
FIG. 18 is a perspective view of an adapter as viewed from a positioning unit.
Figure 19:
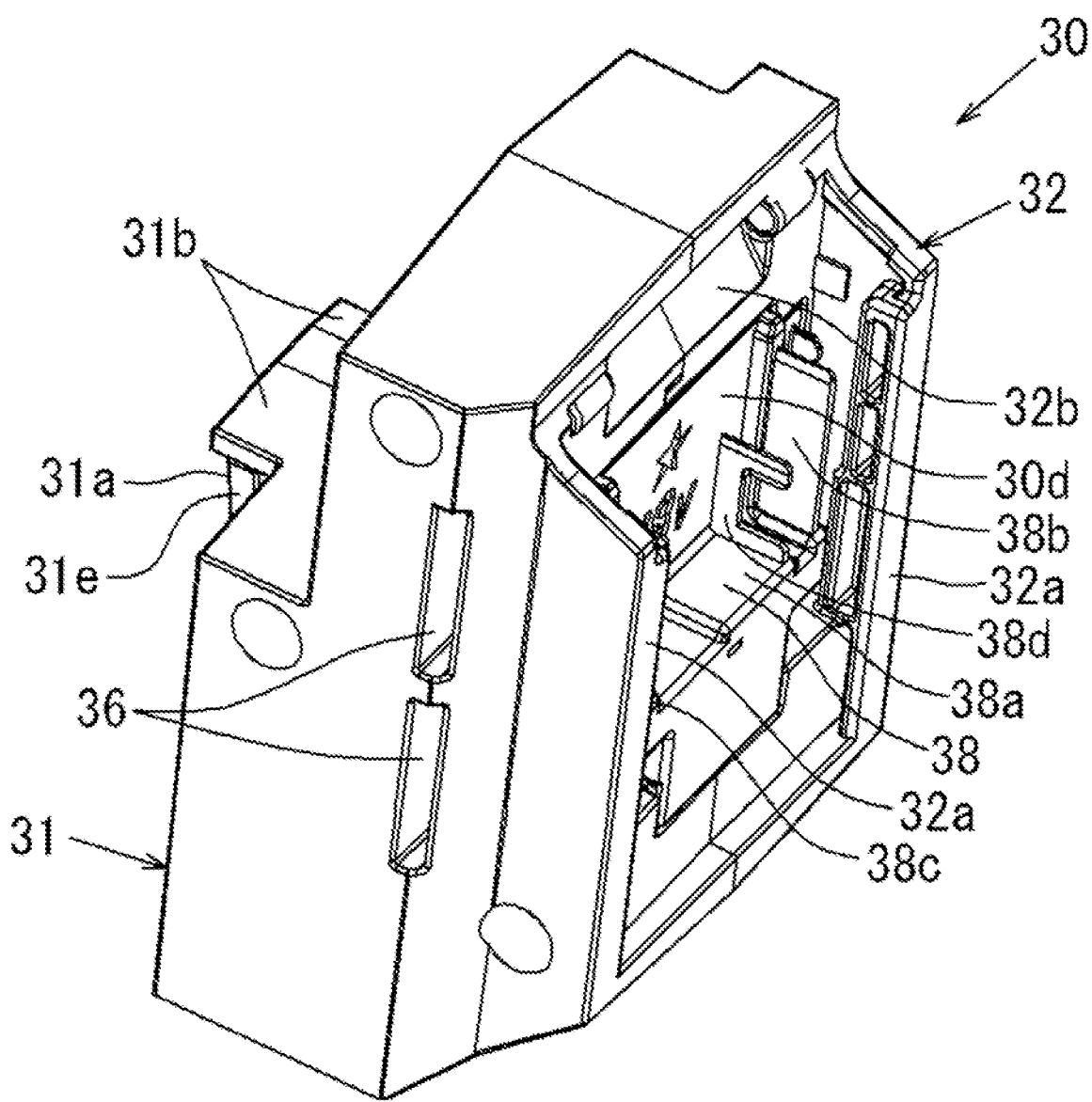
FIG. 19 is a perspective view of the adapter as viewed from a battery holder.

As shown in FIG. 3, an adapter 30 is attachable to the rear of the motor housing 20. As shown in FIGS. 18 and 19, the adapter 30 has a substantially box-shape with a step. The adapter 30 includes a positioning unit 31 and a battery holder (first battery holder) 32 on different surfaces. The positioning unit 31 is attached to the motor housing 20. The battery holder 32 receives a battery 40 in a removable manner.

As shown in FIGS. 18 and 19, the positioning unit 31 includes a rail 31a, engagement parts 31b, and a flat surface 31c. The flat surface 31c is substantially flat. The rail 31a has a T-shaped cross section, and includes a standing portion 31d and extensions 31e. The standing portion 31d protrudes from the flat surface 31c. The extensions 31e extend from the leading end of the standing portion 31d substantially parallel to the flat surface 31c. The engagement parts 31b are located at the end of the rail 31a and protrude from the flat surface 31c. The engagement parts 31b extend in a direction substantially perpendicular to the longitudinal direction of the rail 31a.

As shown in FIGS. 18 and 19, the adapter 30 includes a first surface 30c, a second surface 30d, a body engagement surface 30e, and a bottom surface 30f. The first surface 30c includes the positioning unit 31. The second surface 30d includes the battery holder 32. The first surface 30c is opposite to and substantially parallel to the second surface 30d. The body engagement surface 30e and the bottom surface 30f are substantially perpendicular to the first surface 30c and the second surface 30d. The body engagement surface 30e is an end face of the adapter 30 in the breadthwise direction, and is located adjacent to the cutting machine body 10 when the adapter 30 is attached to the cutting machine body 10. In this posture, the body engagement surface 30e is located on the upper left of the cutting machine body 10. The bottom surface 30f is an end face of the adapter 30 in the lengthwise direction, and is located adjacent to the cutting machine body 10 when the adapter 30 is attached to the cutting machine body 10. In this posture, the bottom surface 30f is located at the lower left of the cutting machine body 10.

As shown in FIG. 18, the positioning unit 31 includes a ventilation part (second ventilation part) 33. The ventilation part 33 is located on the first surface 30c, which faces the front when the adapter 30 is attached to the cutting machine body 10, and on the bottom surface 30f. The ventilation part 33 has a second ventilation hole 33a allowing passage into and out of the adapter 30. The second ventilation hole 33a is a corner hole open in the first surface 30c through the bottom surface 30f.

As shown in FIG. 19, the battery holder 32 includes a pair of rails 32a extending in the longitudinal direction of the adapter 30 and an engagement recess 32b. The rails 32a extend along the two edges of the adapter 30 and face each other. The engagement recess 32b is engaged with an engagement tab 40b of the battery 40 shown in FIG. 22.

Figure 29:
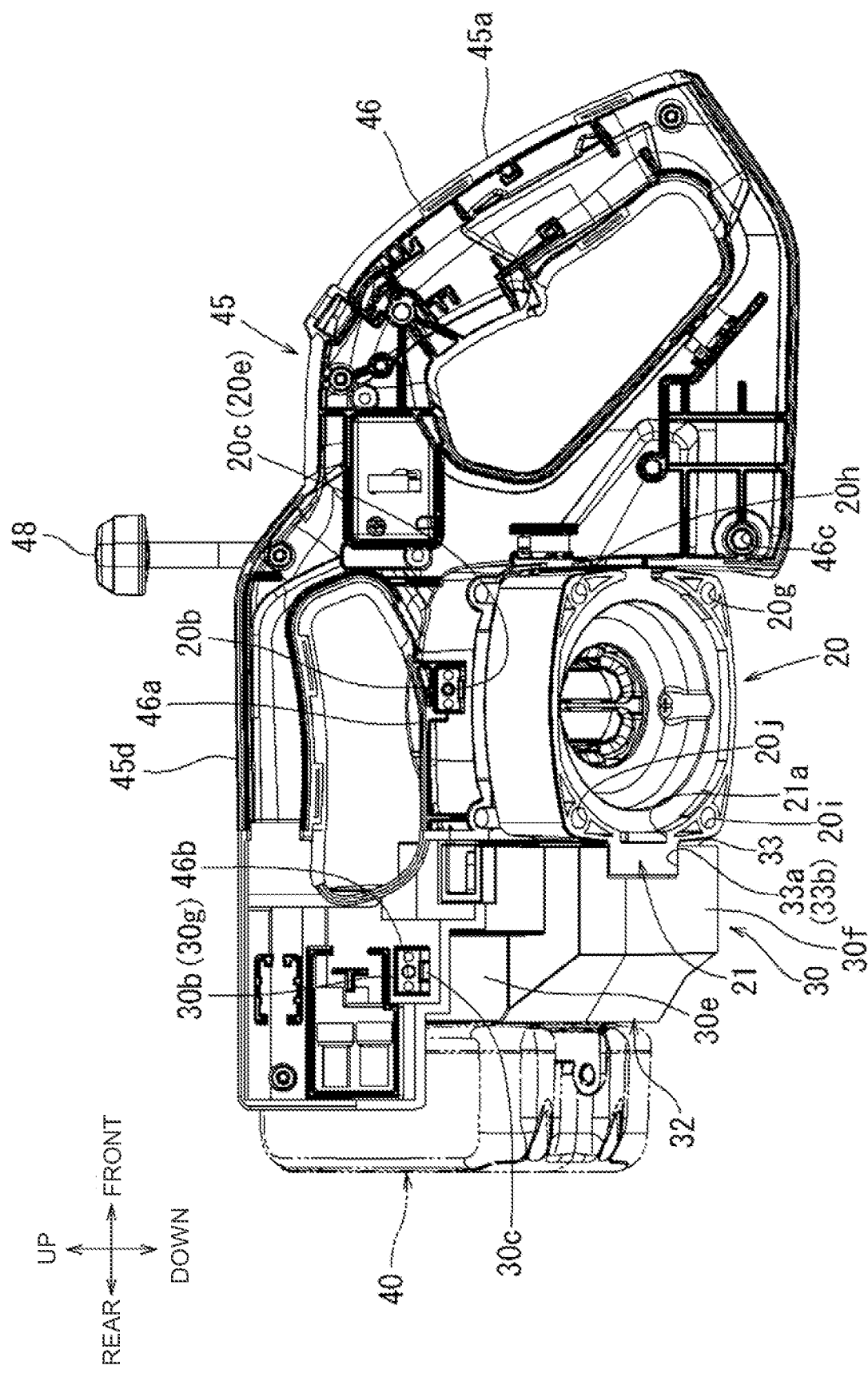
FIG. 29 is a left side view of the right handle part with the motor housing and the adapter attached.
Figure 30:
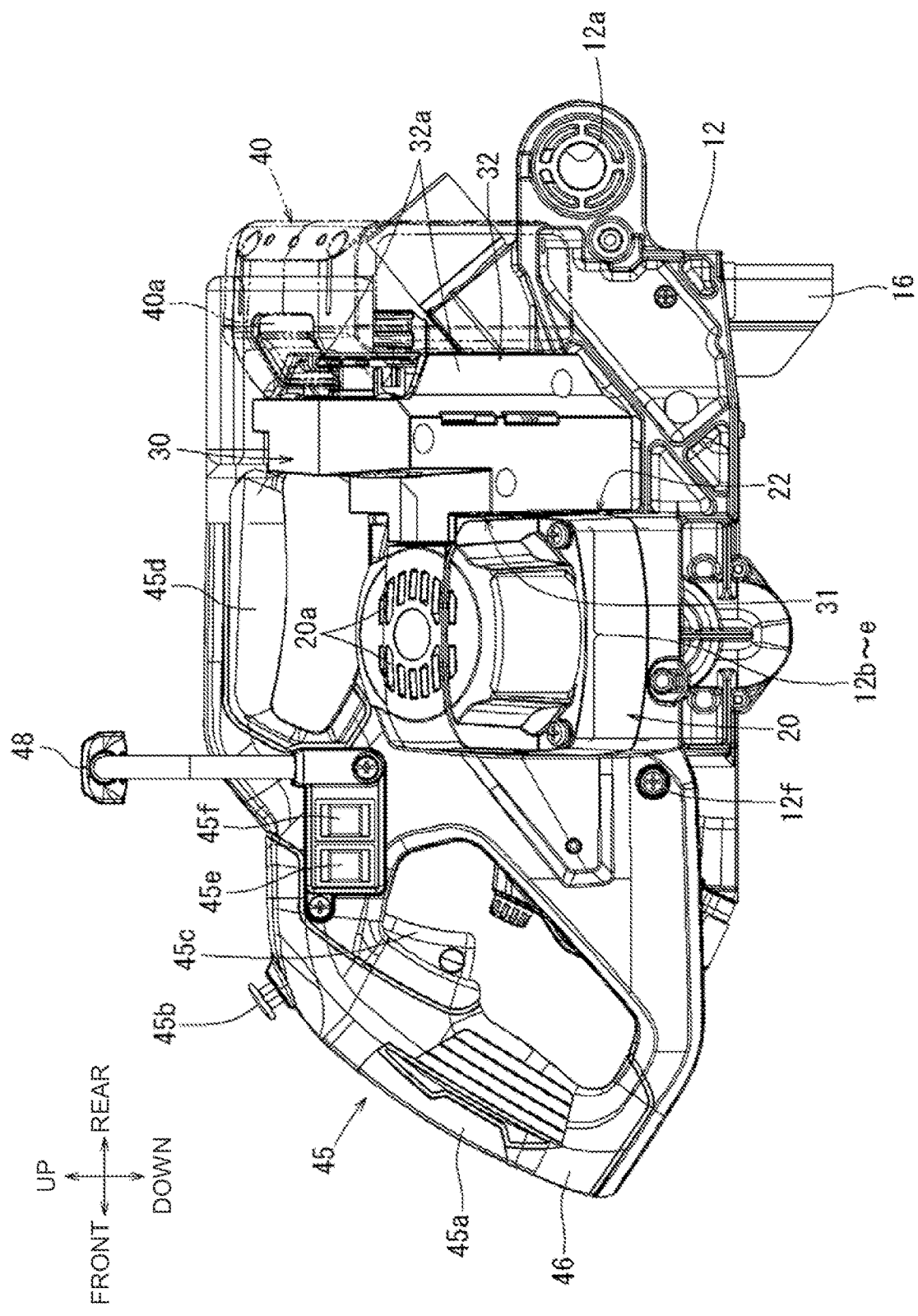
FIG. 30 is a right side view of the handle with the motor housing, the adapter, and a stationary cover attached.

As shown in FIG. 18, the body engagement surface 30e includes a body holder 30a engageable with the cutting machine body 10. The body holder 30a protrudes as a substantially triangular prism. The body holder 30a has a screw hole 30b. As shown in FIG. 29, when attached to the right handle part 46, the adapter 30 has the screw hole 30b extending horizontally.

As shown in FIGS. 18, 19, and 32, the adapter 30 accommodates a terminal unit 38 and the controller 35. Lead wires 34 extend from the terminal unit 38 through the controller 35 to the motor 25 and other components for electrical connection. The terminal unit 38 includes positive and negative power terminals 38b and 38c, a signal terminal 38d, and a terminal base 38a. The terminal base 38a includes the three terminals, or the positive and negative power terminals 38b and 38c and the signal terminal 38d, which are molded with resin. The controller 35 includes a shallow and substantially rectangular case and a control board accommodated in the case and molded with resin. The controller 35 is placed in the adapter 30 with its longitudinal direction aligned with the longitudinal direction of the adapter 30.

As shown in FIG. 32, the controller 35 includes a control circuit and a power circuit for mainly controlling the motor 25. The controller 35 incorporates the control circuit, a drive circuit, an automatic stop circuit, and other circuits. The control circuit includes a microcomputer that transmits a control signal based on positional information about the rotor 25c detected by the sensor board 25d. The drive circuit includes a field-effect transistor (FET) that switches a current flowing through the motor 25 in response to the control signal received from the control circuit. The automatic stop circuit cuts power supply to the motor 25 to prevent overdischarge or overcharge based on the detected status of the battery 40.

As shown in FIGS. 20 to 23, the battery 40 is box-shaped, and is, for example, a lithium-ion battery with an output of 18 V. The battery 40 detached from the battery holder 32 is rechargeable with a separately prepared charger. The battery 40 can be used to power a screwing machine, an electric drill, and other rechargeable power tools.

As shown in FIGS. 20 to 23, the battery 40 includes a pair of rails 40c and connector terminals 40d. The two rails 40c extend parallel to each other in the longitudinal direction of the battery 40. To attach or detach the battery 40 to or from the battery holder 32, the rails 40c in the battery 40 are slid along the rails 32a in the battery holder 32 in the direction indicated by a solid-white arrow in the figures. The connector terminals 40d are located in an area between the rails 40c. When the battery 40 is installed in the battery holder 32, the connector terminals 40d are electrically connected to the positive and negative power terminals 38b and 38c and the signal terminal 38d in the battery holder 32 shown in FIG. 23. This electrically connects the battery 40 to the controller 35 and the terminal unit 38, and then to the motor 25 or other components.

As shown in FIGS. 20 to 23, the battery 40 includes a disengagement button 40a and the engagement tab 40b. The engagement tab 40b protrudes toward the battery holder 32, and is urged by an urging member (not shown) in the protruding direction. The disengagement button 40a is located on a side surface of the battery 40. Pressing the disengagement button 40a retracts the engagement tab 40b into the battery 40 against the urging force applied from the urging member.

When the battery 40 is installed in the battery holder 32, the urging force from the urging member readily causes the engagement tab 40b to be engaged with the engagement recess 32b. The battery 40 is thus held by the battery holder 32. With the engagement tab 40b engaged with the engagement recess 32b, the disengagement button 40a is pressed. This disengages the engagement tab 40b from the engagement recess 32b, thus detaching the battery 40 from the battery holder 32.

Figure 24:
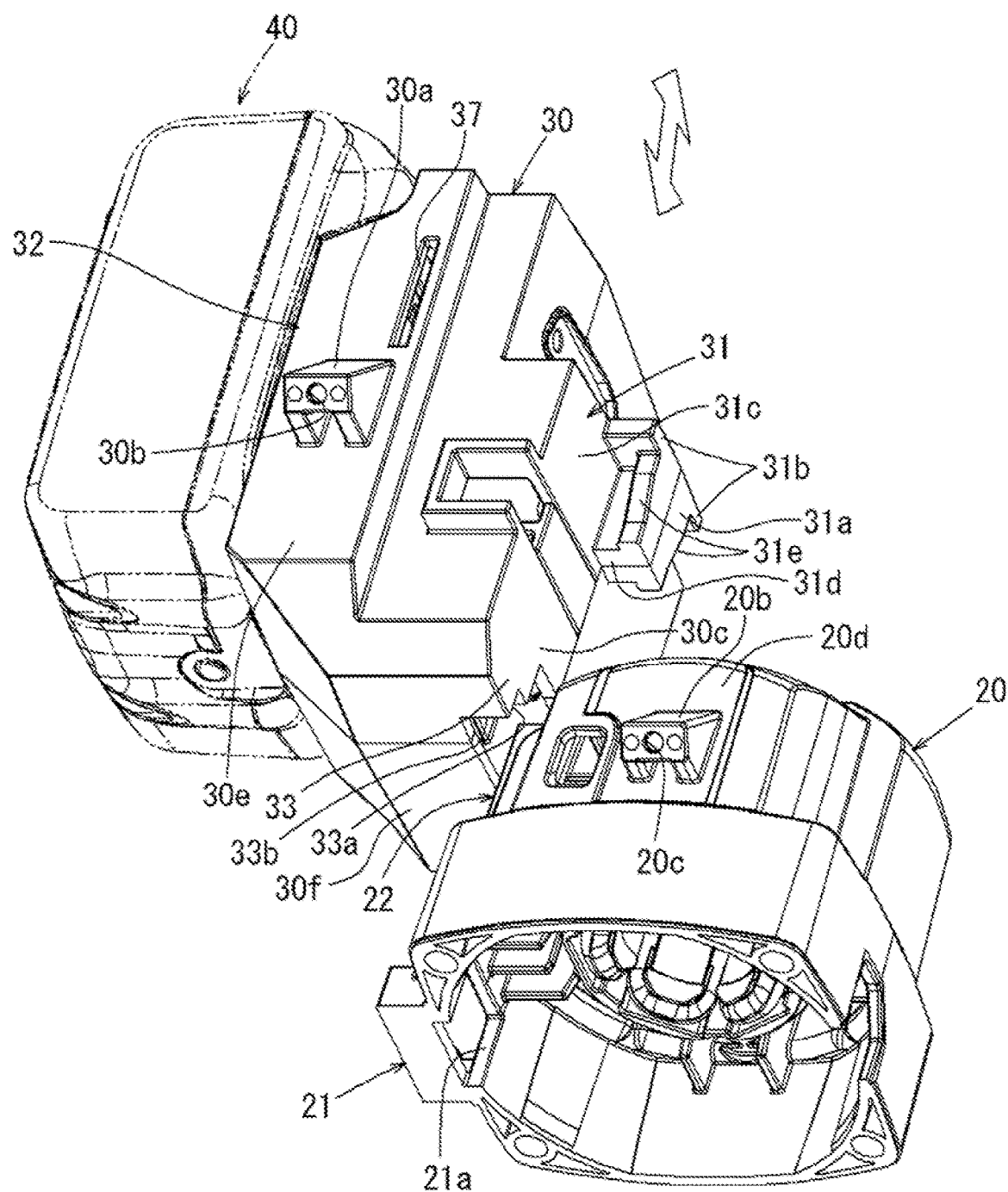
FIG. 24 is a perspective view of a motor housing and the adapter currently being attached to and detached from the motor housing as viewed from inside.
Figure 25:
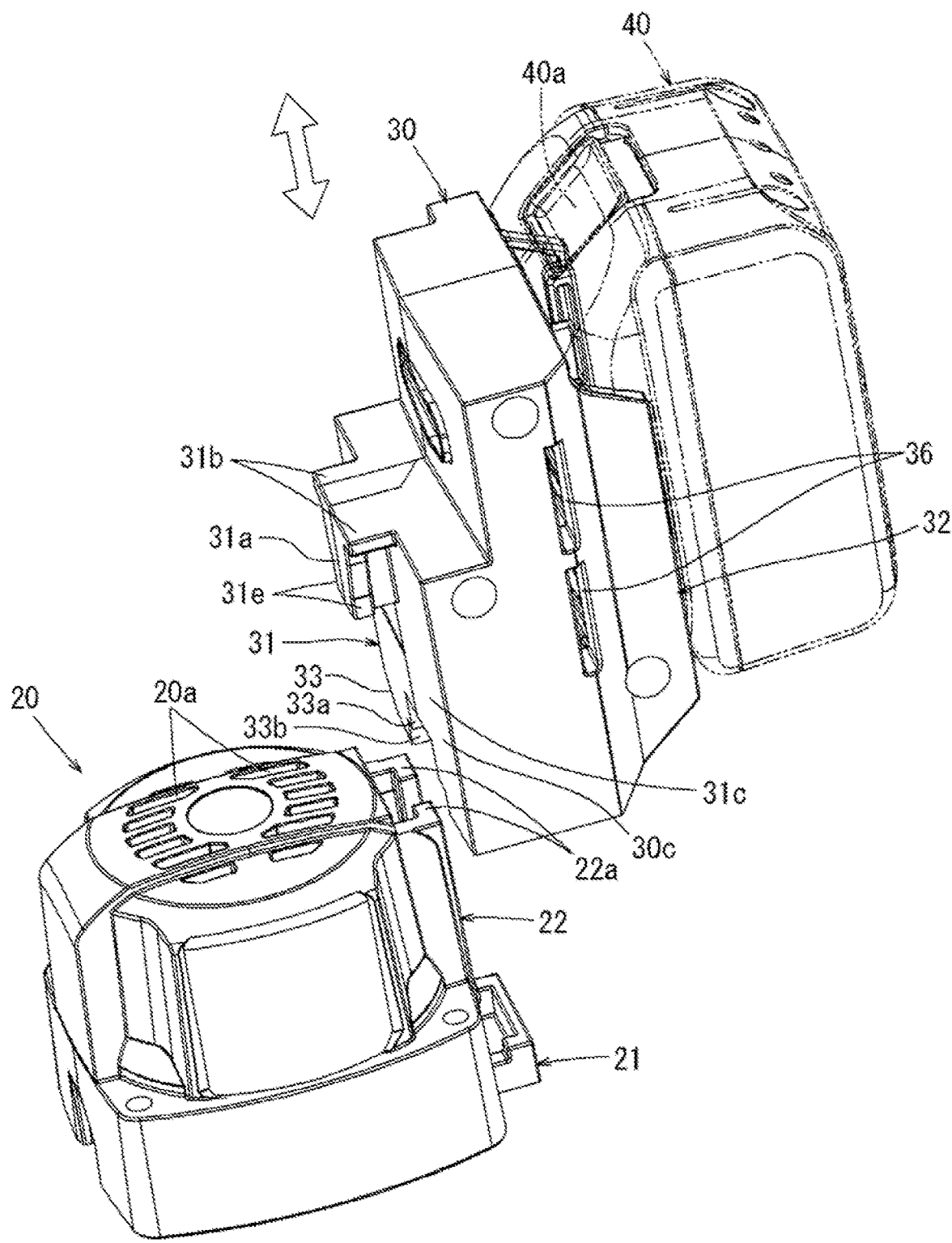
FIG. 25 is a perspective view of the motor housing and the adapter currently being attached to and detached from the motor housing as viewed from outside.

As shown in FIGS. 24 and 25, a positioning unit 22 is located at the rear of the motor housing 20. The positioning unit 22 positions the adapter 30 with respect to the motor housing 20. The positioning unit 22 includes a pair of right and left rails 22a and a blocking part (first ventilation part) 21. The rails 22a extend parallel to the axial direction of the substantially cylindrical motor housing 20. As shown in FIG. 29, the blocking part 21 is located at the lower left when the motor housing 20 is attached to the right handle part 46.

As shown in FIG. 25, the blocking part 21 has a substantially box-shape extending rearward from the positioning unit 22. The adapter 30 is slid onto the motor housing 20 along the rails 22a to allow the blocking part 21 to be fitted into the second ventilation hole 33a. The standing portion 31d of the adapter 30 and the rails 22a in the motor housing 20 are not press-fitted with an interference, but are loosely fitted with a small clearance. This allows quick manual assembly. As shown in FIG. 24, the blocking part 21 has a substantially rectangular first ventilation hole 21a that allows passage into and out of the motor housing 20. As shown in FIG. 32, the first ventilation hole 21a is located on the radial extension of the motor fan 26 and opens toward the motor fan 26.

Figure 26:
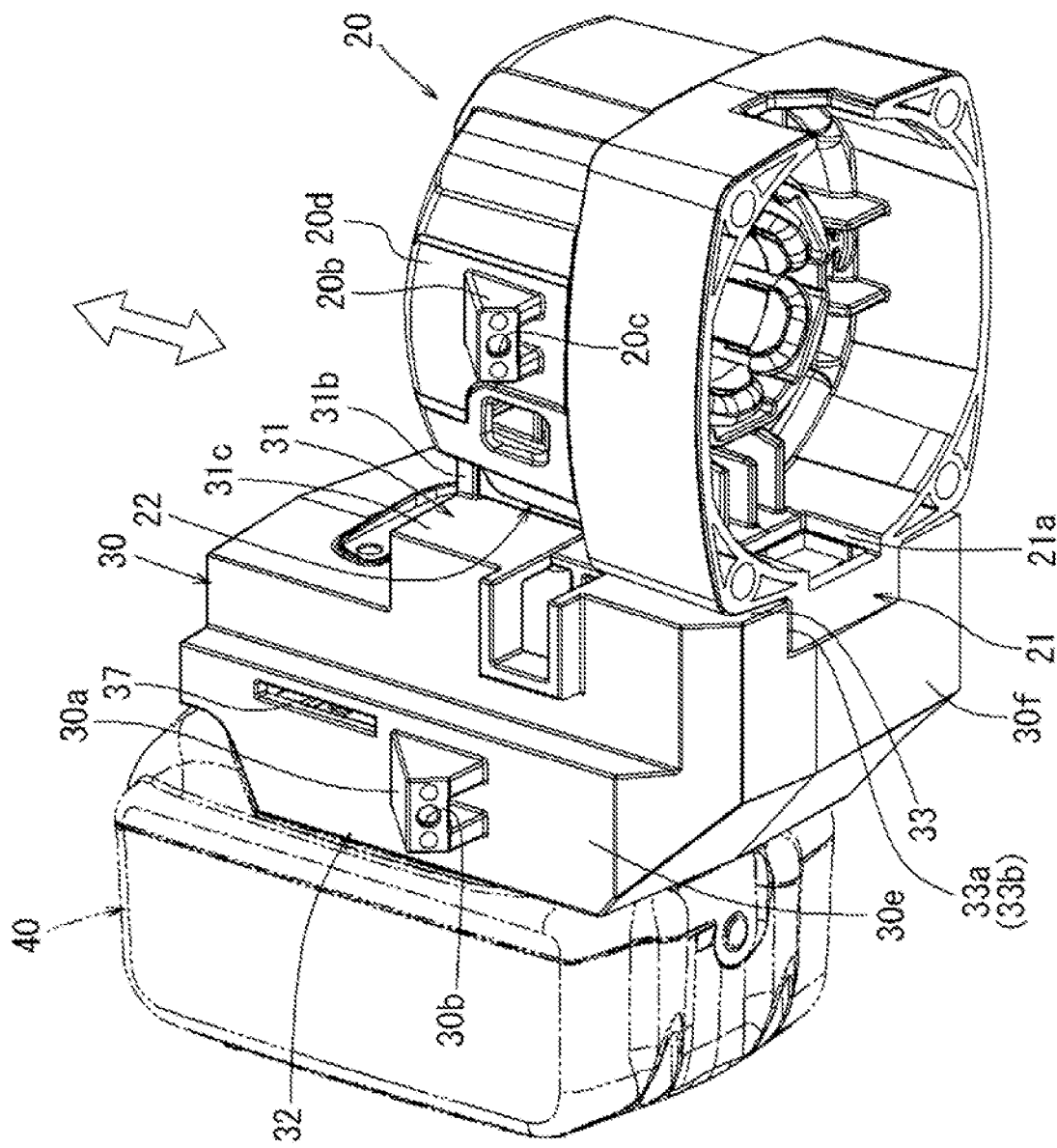
FIG. 26 is a perspective view of the motor housing and the adapter as viewed from inside.
Figure 27:
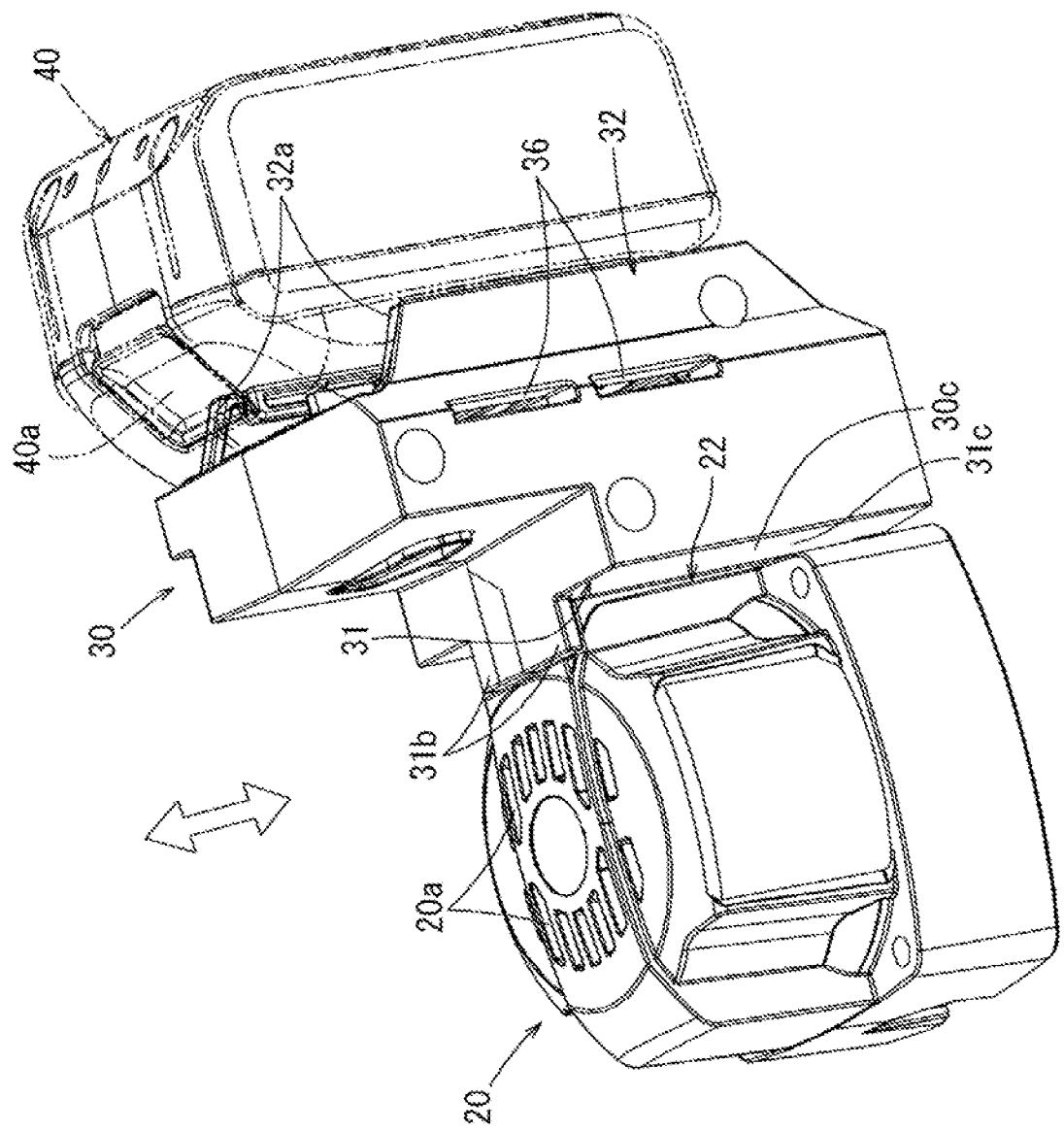
FIG. 27 is a perspective view of the motor housing and the adapter as viewed from outside.

As shown in FIGS. 24 and 26, the motor housing 20 has a side surface 20d on the left when the motor housing 20 is attached to the cutting machine body 10. The side surface 20d has a protrusion 20b protruding as a substantially triangular prism. The protrusion 20b has a screw hole 20c. As shown in FIG. 29, when attached to the right handle part 46, the motor housing 20 has the screw hole 20c extending horizontally.

As shown in FIGS. 24 to 27, the rail 31a in the adapter 30 is slid along the rails 22a in the motor housing 20 in the direction indicated by a solid-white arrow in the figures. This allows the adapter 30 to be attached to or detached from the positioning unit 22 in the longitudinal direction of the motor housing 20. When the adapter 30 is attached to the positioning unit 22 along the motor housing 20, the blocking part 21 is fitted into a cutout 33b at the inlet of the ventilation part 33. This allows the first ventilation hole 21a to communicate with the second ventilation hole 33a. The blocking part 21 fitted in the cutout 33b positions the adapter 30 with respect to the motor housing 20.

When the motor fan 26 rotates, motor cooling air is drawn into the motor housing 20 through the inlet 20a as indicated by an arrow in FIG. 32. The motor cooling air then flows toward the motor fan 26 along the motor shaft 25a. The motor fan 26 radially blows the motor cooling air. The motor cooling air flows into the adapter 30 through the first ventilation hole 21a and the second ventilation hole 33a. The motor cooling air thus cools the controller 35 and the terminal unit 38 accommodated in the adapter 30. The motor cooling air then diverges and exits through a right exhaust air window 36 and a left exhaust air window 37.

Figure 28:
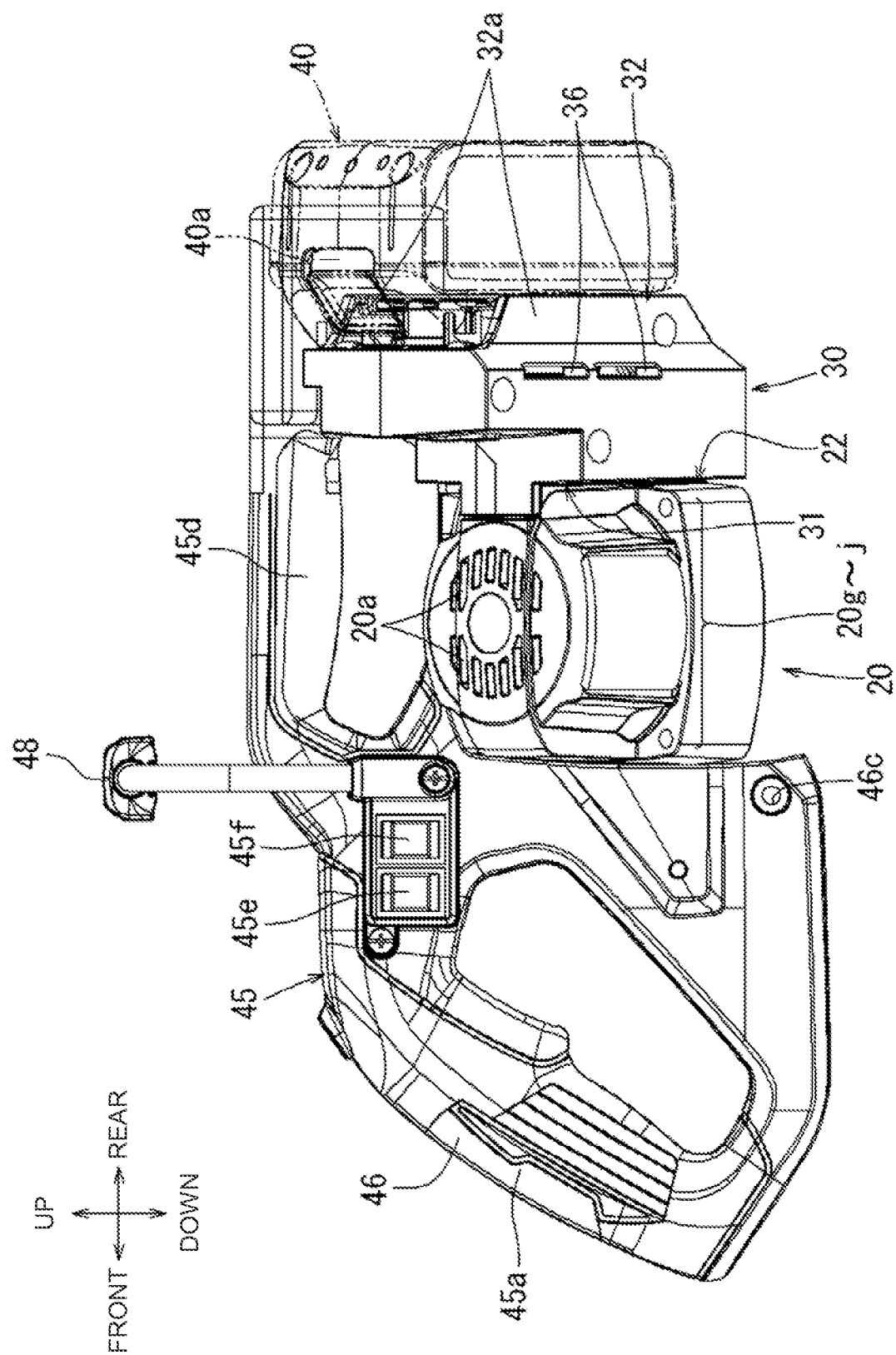
FIG. 28 is a right side view of a right handle part with the motor housing and the adapter attached.

As shown in FIGS. 28 and 29, the motor housing 20 and the adapter 30 are attachable to the right handle part 46. The right handle part 46 has fitting holes 46a and 46b. The fitting hole 46a is a substantially rectangular hole elongated in the front-rear direction to receive the protrusion 20b on the motor housing 20. The fitting hole 46b is a substantially rectangular hole elongated in the front-rear direction to receive the body holder 30a on the adapter 30. When the motor housing 20 and the adapter 30 are attached to the right handle part 46, the protrusion 20b on the motor housing 20 is fitted into the fitting hole 46a, and the body holder 30a on the adapter 30 is fitted into the fitting hole 46b. This positions the motor housing 20 and the adapter 30 with respect to the right handle part 46.

As shown in FIGS. 28 and 29, the left handle part 47 is joined together and aligned with the right handle part 46 with the protrusion 20b in the fitting hole 46a in the right handle part 46 and the body holder 30a on the adapter 30 in the fitting hole 46b in the right handle part 46. The screw hole 20c in the protrusion 20b then receives a fastening screw 20e (not shown) for fastening the motor housing 20, the right handle part 46, and the left handle part 47. The screw hole 30b in the body holder 30a then receives a fastening screw 30g for fastening the adapter 30, the right handle part 46, and the left handle part 47. This integrates the four components, namely, the motor housing 20, the adapter 30, the right handle part 46, and the left handle part 47 together. The screw holes 20c and 30b are substantially parallel to each other when the motor housing 20 and the adapter 30 are combined together. The two screws placed through the screw holes 20c and 30b are thus parallel to each other. In this manner, the four components can be quickly integrated together.

Figure 31:
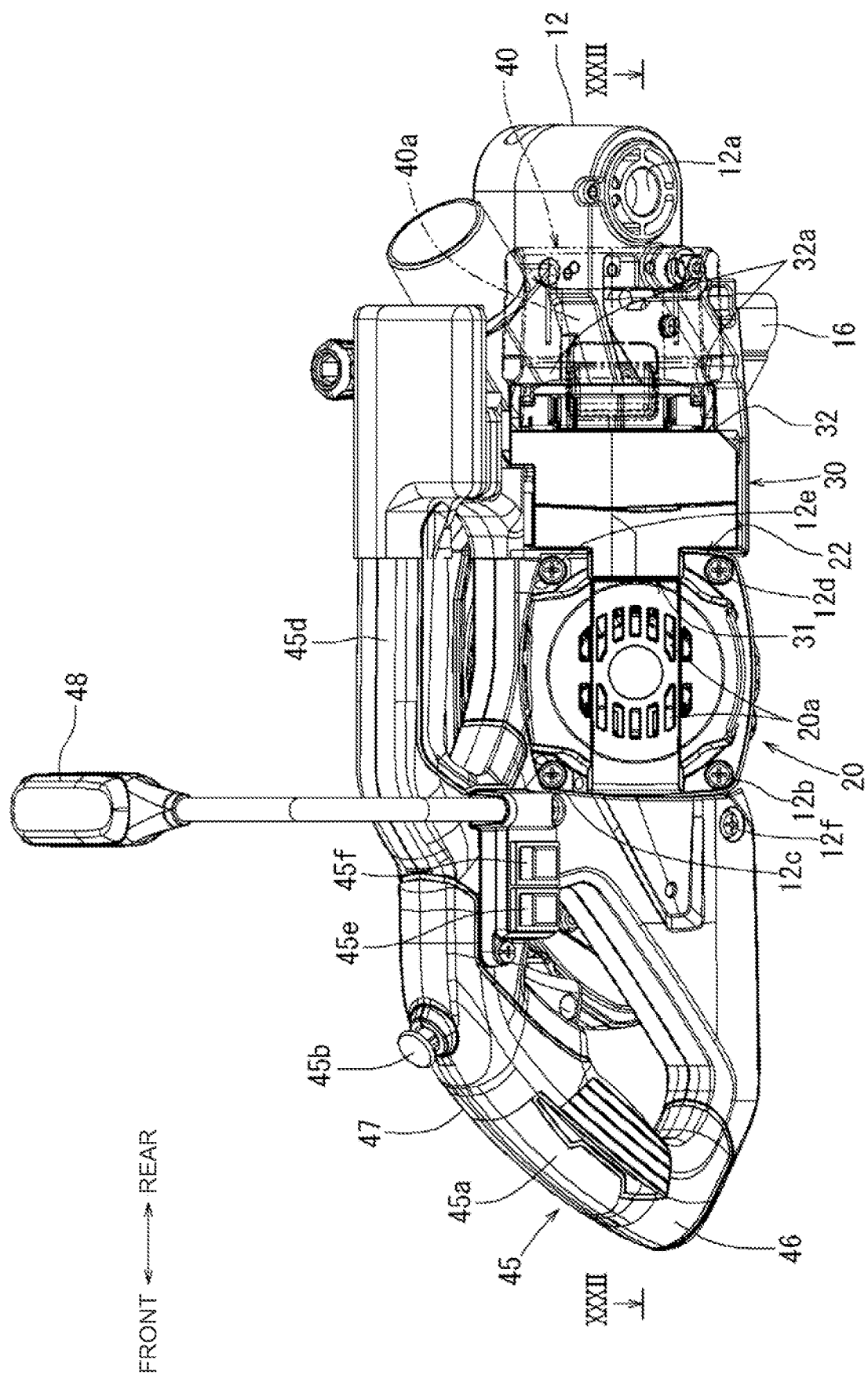
FIG. 31 is a perspective view of FIG. 30 as viewed in the longitudinal direction of the motor housing.

The integrated four components are attachable to the stationary cover 12 with screws. As shown in FIGS. 28, 29, and 31, four fastening screws 12b to 12e for fastening the motor housing 20 and the stationary cover 12 are first placed through four through-holes 20g to 20j open at the four corners of the motor housing 20, and are fastened to the stationary cover 12. The four through-holes 20g to 20j are parallel to the motor 25. Then, a fastening screw 12f for fastening the right handle part 46 and the stationary cover 12 is placed through a through-hole 46c in the right handle part 46 open at right angles to the cutting blade 11, and is screwed onto the stationary cover 12.

Figure 33:
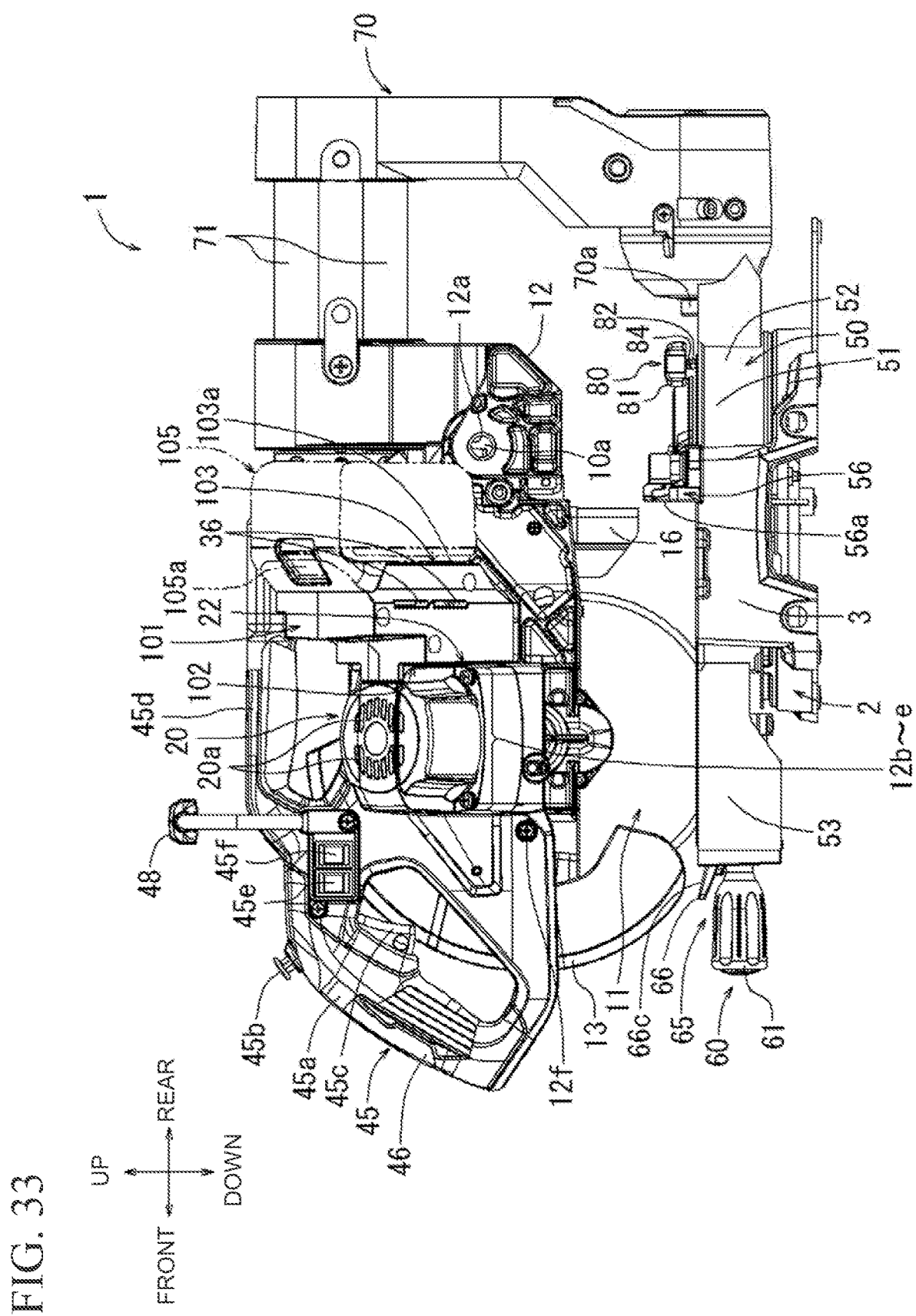
FIG. 33 is a right side view of the cutting machine with a second adapter attached.
Figure 34:
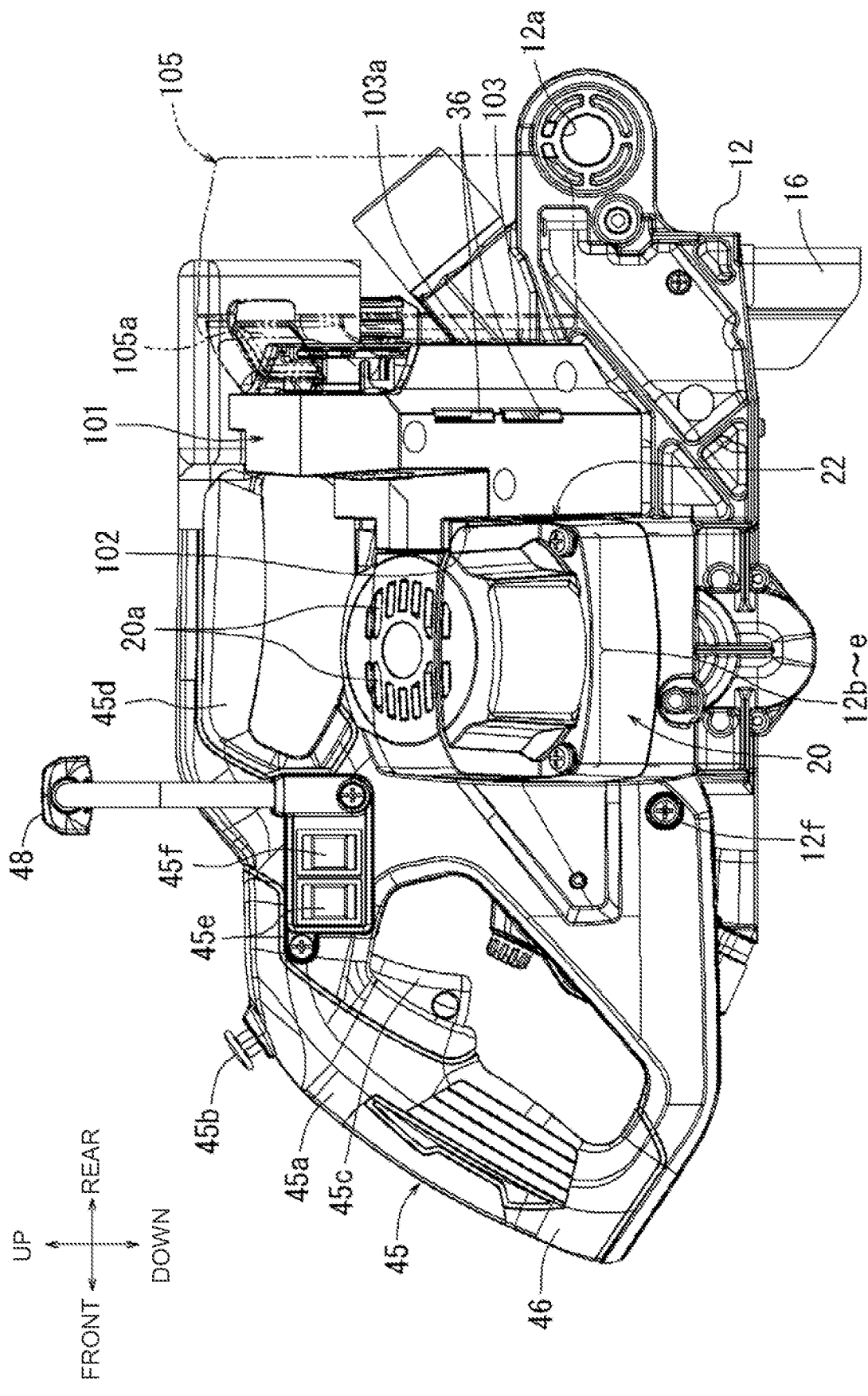
FIG. 34 is a right side view of the handle with the motor housing, the second adapter, and the stationary cover attached.

As shown in FIGS. 33 and 34, the positioning unit 22 in the motor housing 20 may receive an adapter (second adapter) 101 in place of the adapter (first adapter) 30. The adapter 101 is attachable to the positioning unit 22, and includes a positioning unit 102 having the same structure as the positioning unit 31.

As shown in FIGS. 33 and 34, the adapter 101 includes a battery holder 103 in place of the battery holder 32 in the adapter 30. The battery holder (second battery holder) 103 includes a rail 103a extending in the longitudinal direction of the adapter 101. The battery holder 103 receives a removable battery (second battery) 105 shaped differently from the battery (first battery) 40. The battery 105 is box-shaped, and may be a lithium-ion battery with an output of 36 V. The battery 105 detached from the battery holder 103 is rechargeable with a separately prepared charger. The adapter 101 includes a body holder 30a with the same shape as the body holder 30a of the adapter 30.

Figure 35:
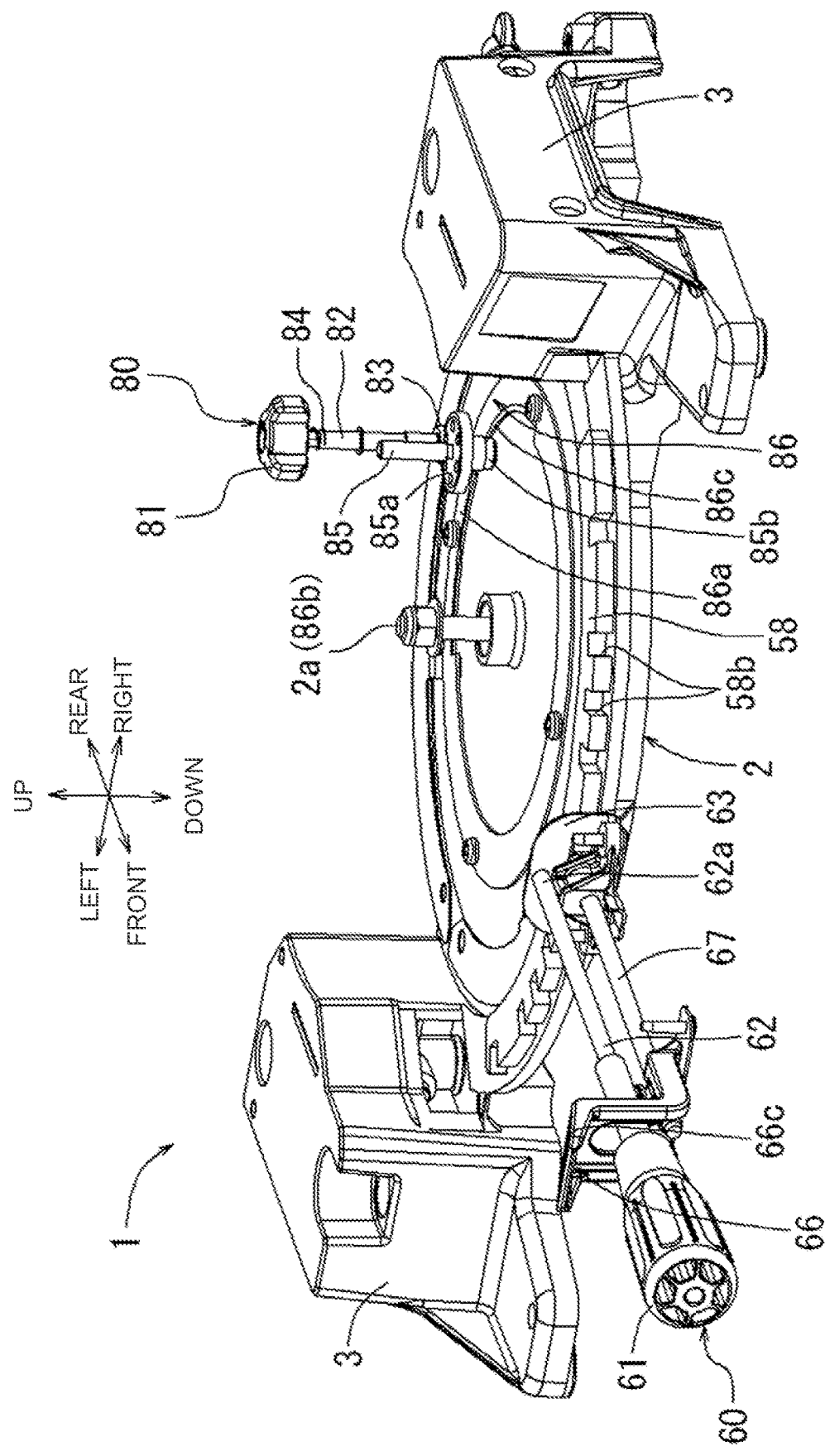
FIG. 35 is a perspective view of a base and a fine angle adjuster.
Figure 36:
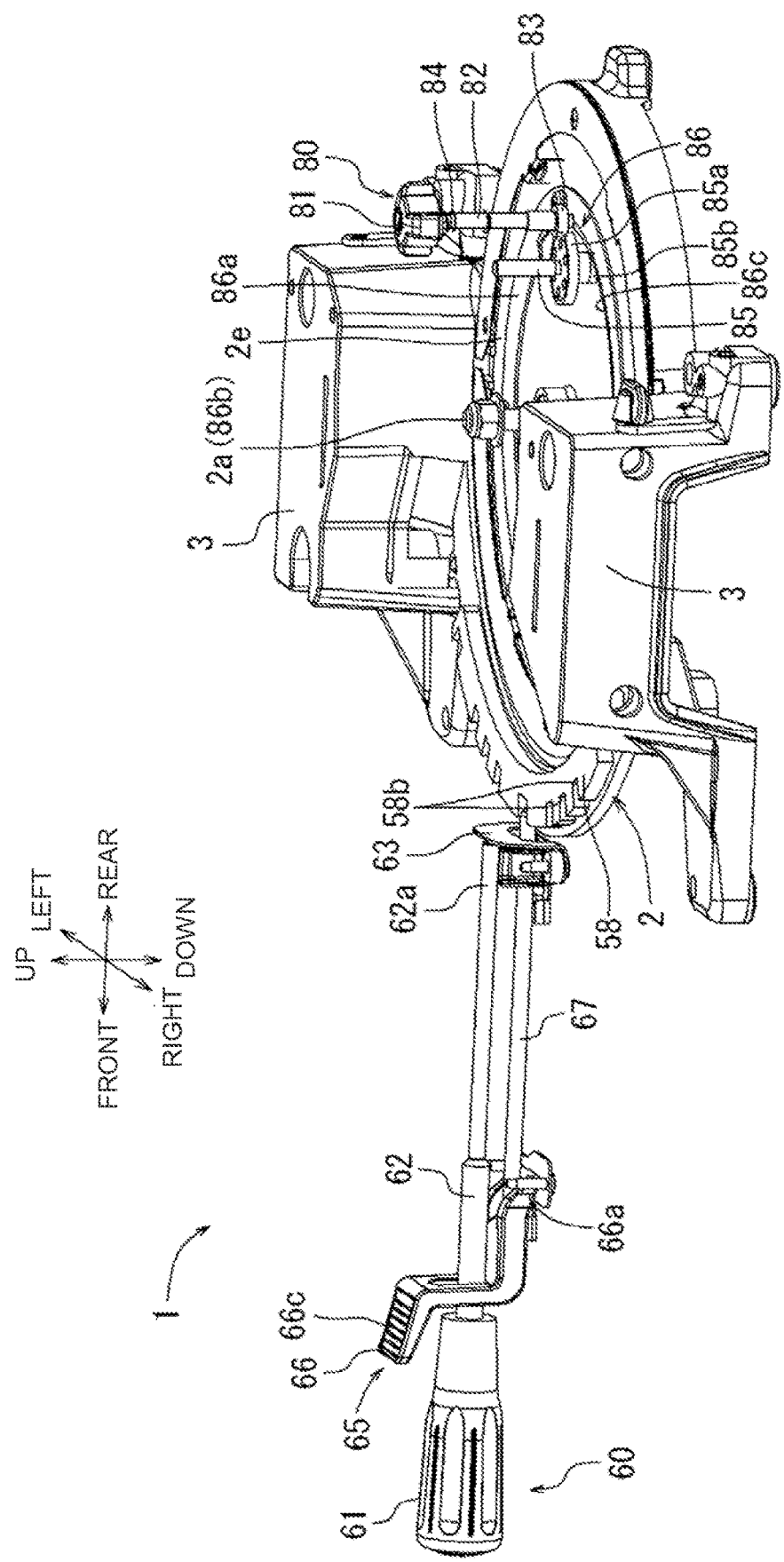
FIG. 36 is a perspective view of the base and the fine angle adjuster.

As shown in FIGS. 35 and 36, the cutting machine 1 may further include a fine angle adjuster 80 that adjusts the rotation angle of the turntable 50 with respect to the base 2.

As shown in FIGS. 35 and 36, the fine angle adjuster 80 is located in an area at the rear of the base 2 and the turntable 50. The fine angle adjuster 80 includes an operation part 81, a reduction shaft 85, and a rack 86. The rack 86 extends along an inner peripheral wall 2e of the base 2. The inner peripheral wall 2e is located inward from the outer peripheral table wall 52 of the turntable 50 and nearer the rotation support shaft 2a. The inner peripheral wall 2e extends vertically (perpendicularly) and faces the rotation support shaft 2a. The inner peripheral wall 2e is arc-shaped, with the rotation support shaft 2a at the center in a plan view.

As shown in FIGS. 35 and 36, the rack 86 includes a rack body 86a and a plurality of teeth 86c. The rack body 86a is arc-shaped, with the rotation support shaft 2a as an arc center axis 86b. The teeth 86c are arranged at circumferentially predetermined intervals on the inner peripheral surface of the rack body 86a. The teeth 86c protrude from the rack body 86a toward the radial center. The teeth 86c define tooth grooves between adjacent teeth. The teeth 86c extend vertically (perpendicularly).

As shown in FIGS. 12 and 35 to 37, a rotational shaft 82 includes the operation part 81 on its upper end and a first pinion 83 on its lower end. The operation part 81 is located above the upper surface of the turntable 50, and is operable by the user. The operation part 81 is located behind the positioning fence 56, inward from the outer peripheral table wall 52 of the turntable 50, and nearer the rotation support shaft 2a. The operation part 81 is integral with the rotational shaft 82. The rotational shaft 82 is supported on the turntable 50 in a manner rotatable about the axis. The rotational shaft 82 has, in its lower portion, the first pinion 83 that is coaxial with the rotational shaft 82. The first pinion 83 has tooth grooves extending vertically. When the operation part 81 rotates about the rotational shaft 82, the rotational shaft 82 and the first pinion 83 rotate integrally with the operation part 81.

Figure 37:
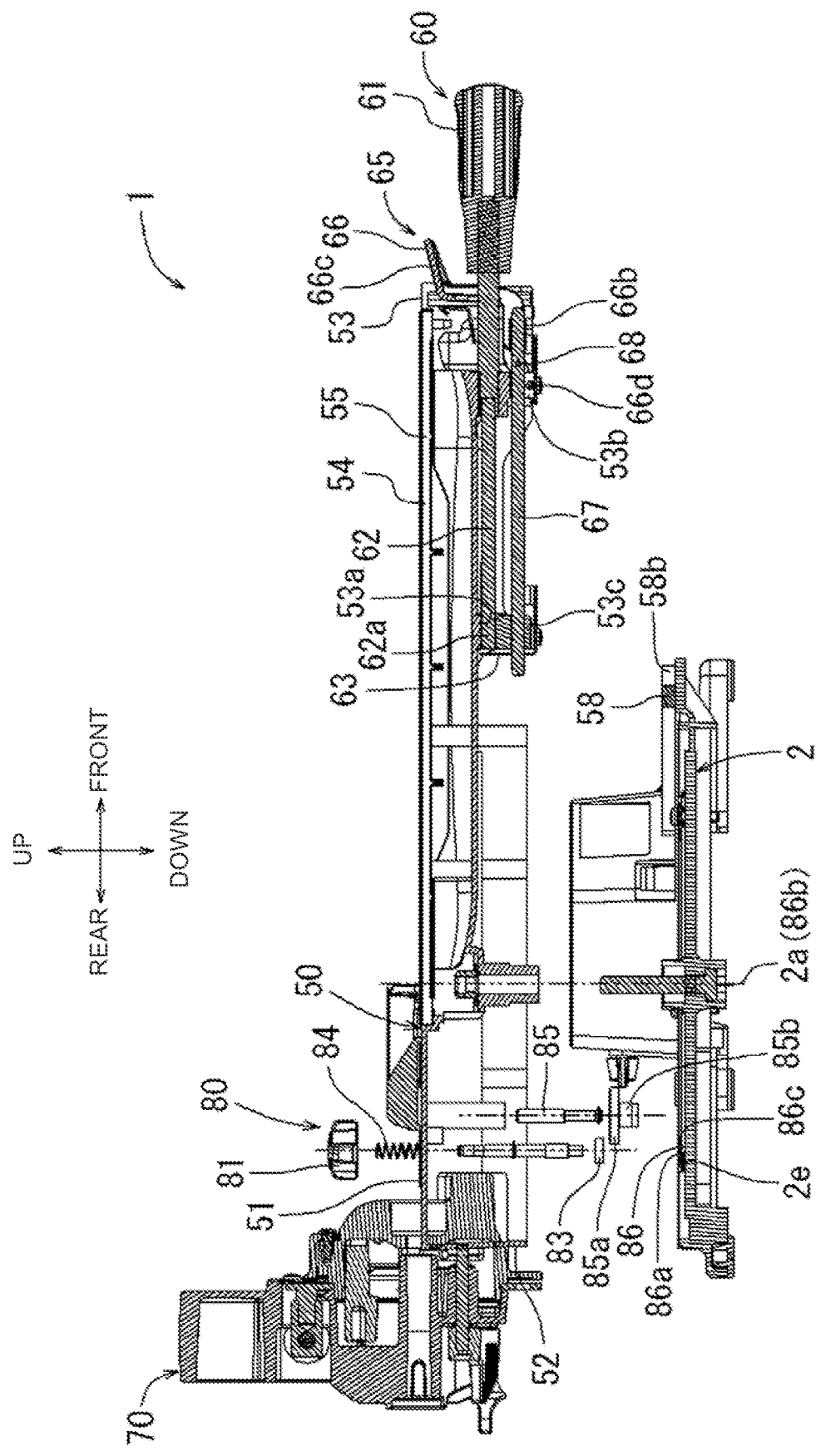
FIG. 37 is an enlarged partial view of area XIII in FIG. 12 in the exploded fine angle adjuster.

As shown in FIGS. 12 and 37, a compression spring 84 for urging the operation part 81 upward is located between the lower end of the operation part 81 and the upper surface of the turntable 50. When the operation part 81 is urged upward, the rotational shaft 82 and the first pinion 83 are also urged upward. The first pinion 83 thus moves to a release position to be disengaged from a pinion engagement gear 85a of the reduction shaft 85. The first pinion 83 engaged with the rack 86 through the pinion engagement gear 85a and the second pinion 85b is disengaged from the rack 86 at the release position. When the operation part 81 is moved downward against the urging force, the rotational shaft 82 and the first pinion 83 are also moved downward. The first pinion 83 thus moves to an engagement position to be engaged with the pinion engagement gear 85a of the reduction shaft 85. The first pinion 83 is engaged with the rack 86 indirectly through the pinion engagement gear 85a and the second pinion 85b at the engagement position.

As shown in FIGS. 12 and 35 to 37, the reduction shaft (reduction mechanism) 85 is supported on the turntable 50 in a manner rotatable about the axis. The reduction shaft 85 extends vertically and parallel to the rotational shaft 82 to which the first pinion 83 is attached. The reduction shaft 85 has, in its lower portion, the second pinion 85b that is coaxial with the reduction shaft 85. The second pinion 85b is engaged with the rack 86. The pinion engagement gear 85a is located above the second pinion 85b and is coaxial with the reduction shaft 85. The pinion engagement gear 85a is engaged with the first pinion 83 in a disengageable manner. The reduction shaft 85 is thus placed between the first pinion 83 and the rack 86.

As shown in FIGS. 35 and 36, the operation part 81 is pressed downward and rotated against the urging force applied from the compression spring 84. This allows the first pinion 83 to be engaged with the pinion engagement gear 85a. The rotational speed of the operation part 81 is reduced by the engagement of the first pinion 83 with the pinion engagement gear 85a, before the rotation is transmitted. The rotational speed of the pinion engagement gear 85a is reduced by the engagement of the second pinion 85b with the rack 86, before the rotation is transmitted. The first pinion 83 rotates and moves relatively along the rack 86. This rotates the turntable 50 with respect to the base 2 about the rotation support shaft 2a. Thus, the rotating position of the turntable 50 can be adjusted finely.

When the turntable 50 is rotated to an intended angle with respect to the base 2, the user releases the force applied to the operation part 81. The operation part 81 thus moves upward under the urging force applied from the compression spring 84. The first pinion 83 then readily moves to the upper release position. Although the operation part 81 rotates unexpectedly, this structure prevents the turntable 50 from rotating with respect to the base 2.

As shown in FIGS. 1, 18 and 32, the adapter 30 includes the body holder 30a and the battery holder 32. The body holder 30a is attached to the handle 45 and the stationary cover 12 in the cutting machine body 10. The battery holder 32 receives the battery 40 to power the motor 25 in a removable manner. The adapter 30 is thus a component separate from the motor housing 20 and the handle 45 in the cutting machine body 10. The battery 40 may have another shape when, for example, the output from the cutting machine 1 is changed. In this case as well, another adapter 30 is simply designed to install various batteries with different sizes or shapes in the cutting machine body 10, without changing the design of the motor housing 20 and the handle 45. This reduces cost increase associated with production equipment caused by newly designing the cutting machine body 10.

As shown in FIGS. 1 and 24 to 26, the cutting machine 1 includes the positioning unit 31 positioning the adapter 30 with respect to the motor housing 20. The positioning unit 31 can position or temporarily fasten the adapter 30 with respect to the cutting machine body 10. In this state, the left handle part 47 is attached to the right handle part 46, and the integrated four components (the motor housing 20, the adapter 30, the right handle part 46, and the left handle part 47) are attached to the cutting machine body 10. This allows easy attachment of the adapter 30 to the cutting machine body 10.

As shown in FIGS. 1, 26, and 29, the positioning unit 31 positions the adapter 30 with respect to the motor housing 20. The body holder 30a allows the adapter 30 to be attached to a part of the cutting machine body 10 other than the motor housing 20. Thus, the adapter 30 is positioned (temporarily fastened in a loose manner) with respect to the cutting machine body 10 differently from when attached to the cutting machine body 10. The adapter 30 can be attached to the cutting machine body 10 quickly and stably by tightening the screws for attaching the left handle part 47 to integrate the four components as well as for fastening the integrated four components to the stationary cover 12. In other cases, the adapter 30 can be easily attached to the cutting machine body 10.

As shown in FIG. 25, the positioning unit 22 includes the rails 22a in the motor housing 20. The rails 22a extend parallel to the longitudinal direction of the motor housing 20. The adapter 30 is placed along the motor housing 20. The battery 40 is placed in an unused space along the motor housing 20 for space efficiency, thus downsizing the cutting machine body 10. The rails 22a may be relatively elongated along the motor housing 20. This allows the battery 40 to be stably attached to the motor housing 20 through the rails 22a.

Figure 20:
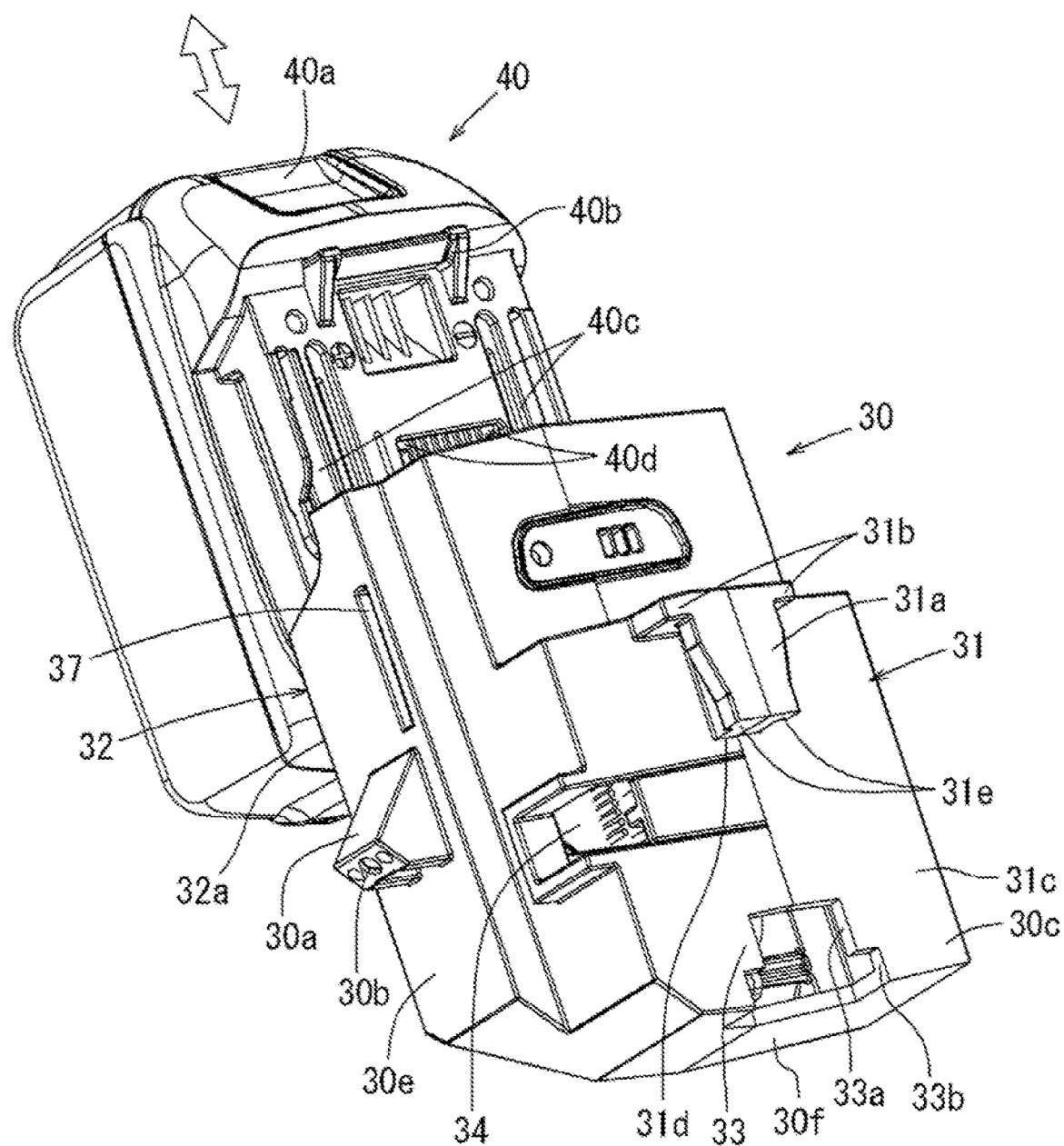
FIG. 20 is a perspective view of the adapter and a battery currently being attached to and detached from the adapter as viewed from the positioning unit.
Figure 21:
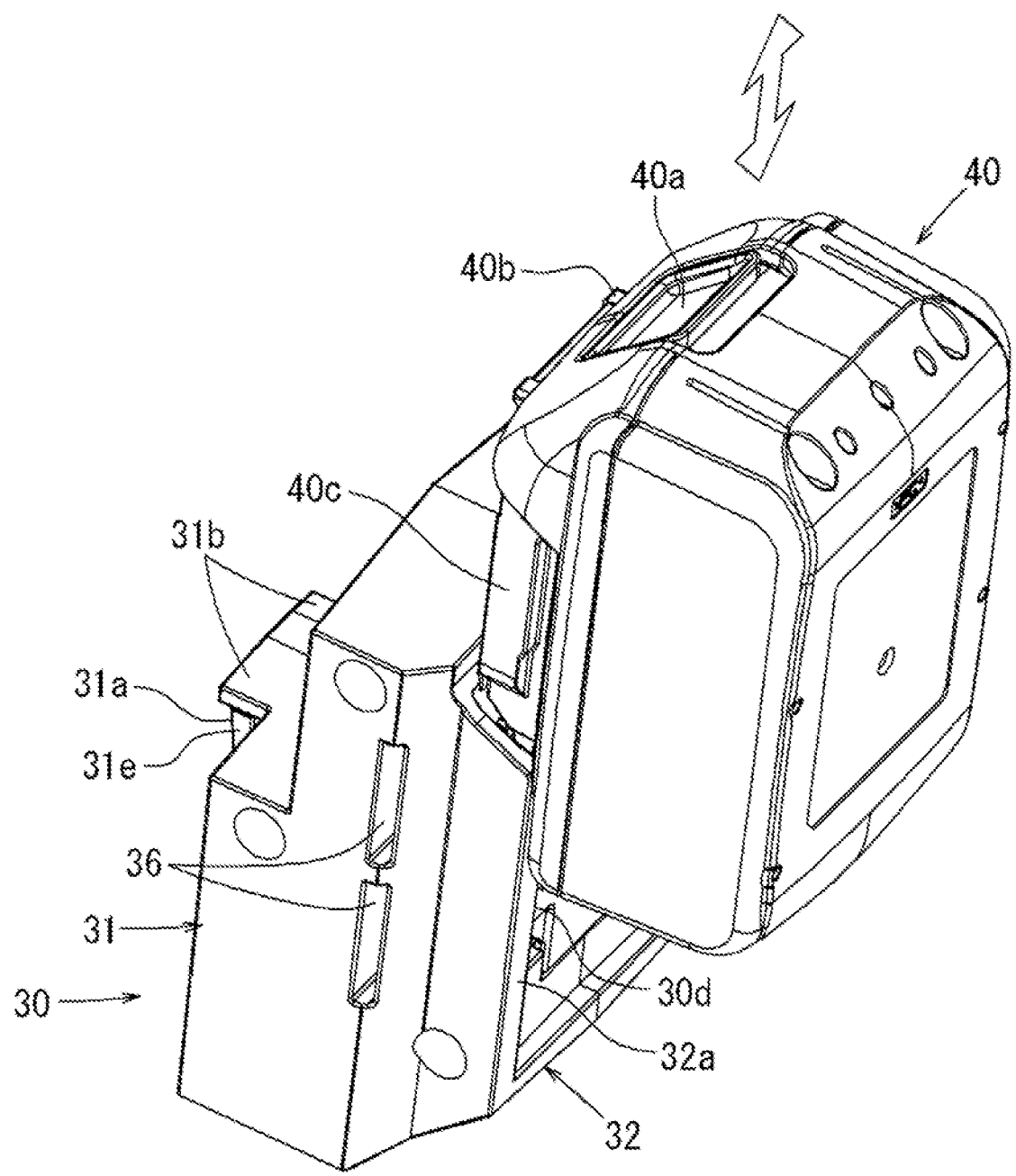
FIG. 21 is a perspective view of the adapter and the battery currently being attached to and detached from the adapter as viewed from the battery holder.
Figure 22:
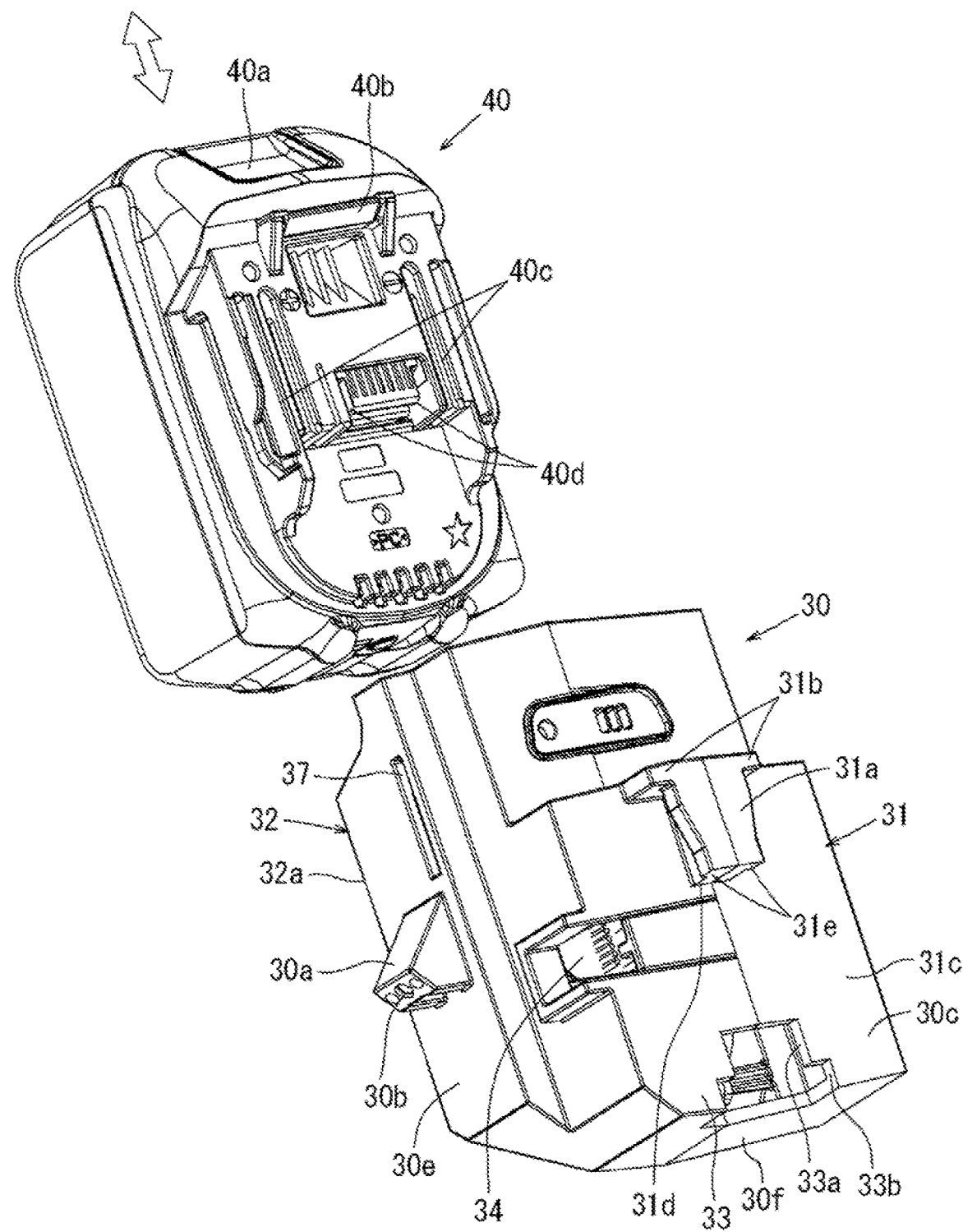
FIG. 22 is a perspective view of the adapter and the battery as viewed from the positioning unit.
Figure 23:
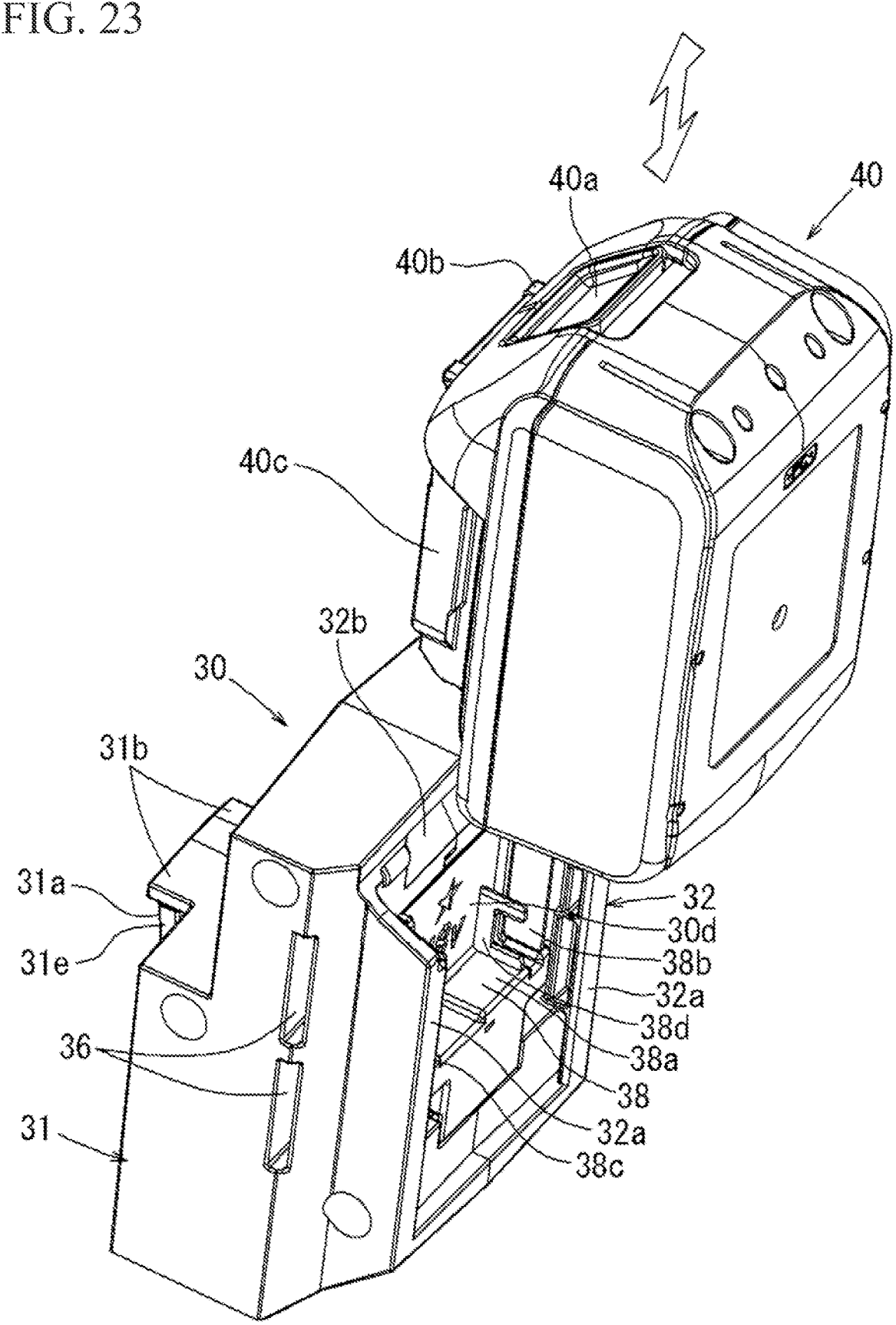
FIG. 23 is a perspective view of the adapter and the battery as viewed from the battery holder.

As shown in FIGS. 20 and 32, the adapter 30 includes the controller 35 and the terminal unit 38. The controller 35 determines the voltage of the battery 40 and controls the motor 25. The terminal unit 38 is electrically connected to the motor 25 through the lead wires 34. Thus, the controller 35 and the terminal unit 38 may be changed together with the adapter 30 for a battery with a different output or shape to be used as the battery 40. This allows components to be changed efficiently for the different battery 40. In other cases, components associated with the output or capacity of the battery 40 may be integrated to easily downsize the cutting machine.

As shown in FIG. 32, the cutting machine 1 includes the motor fan 26 rotatable by the motor 25 to blow air for cooling the motor 25. The motor housing 20 has the first ventilation hole 21a through which the air blown by the motor fan 26 passes. The adapter 30 has the second ventilation hole 33a communicating with the first ventilation hole 21a. The adapter 30 is thus attached to the cutting machine body 10 to communicate with the motor housing 20 through the first ventilation hole 21a and the second ventilation hole 33a. The air that has cooled the motor 25 is drawn into the adapter 30 through the motor housing 20. In the manner described above, electric components accommodated in the adapter 30, such as the controller 35, can be cooled.

As shown in FIGS. 24 and 26, the motor housing 20 includes the blocking part 21 having the first ventilation hole 21a. The adapter 30 includes the second ventilation hole 33a and the ventilation part 33 into which the blocking part 21 is fitted. The blocking part 21 and the ventilation part 33 cooperate with each other to position the adapter 30 with respect to the motor housing 20. The blocking part 21 fitted into the ventilation part 33 allows the first ventilation hole 21a to communicate with the second ventilation hole 33a and the adapter 30 to be positioned with respect to the motor housing 20.

As shown in FIGS. 29 and 31, the cutting machine body 10 includes the stationary cover 12 covering the cutting blade 11 and the handle 45 including the right handle part 46 and the left handle part 47 that are horizontally symmetrical. The right handle part 46, the left handle part 47, the motor housing 20, and the adapter 30 are fastened to the stationary cover 12 with a plurality of screws placed parallel to each other.

The right handle part 46, the left handle part 47, the motor housing 20, and the adapter 30 are thus easily fastened to the stationary cover 12. The stationary cover 12 is relatively large and has high strength. For example, the stationary cover 12 is formed from a metal material, such as aluminum. The motor housing 20 and the adapter 30 are stably supported together with the right handle part 46 and the left handle part 47 with respect to the stationary cover 12.

As shown in FIGS. 3 and 33, the first adapter 30 and the second adapter 101 are attachable to the cutting machine 1. The first adapter 30 includes the first battery holder 32 in which the first battery 40 with a first size is installable. The second adapter 101 includes the second battery holder 103 in which the second battery 105 with a second size is installable. The first adapter 30 or the second adapter 101 is selectively attachable to the cutting machine body 10.

For the first battery 40, the first adapter 30 is selected. For the second battery 105, the second adapter 101 is selected. The first battery 40 and the second battery 105 differ in, for example, voltage and capacity. This structure eliminates the need to newly design the motor housing 20 and the handle 45 for a cutting machine powered by a battery with a different voltage or capacity, thus reducing the cost for production equipment.

As shown in FIGS. 1, 8, and 32, the cutting machine (stationary tool) 1 includes the base 2 placeable on a table or a floor, the cutting machine body (tool body) 10 supported on the base 2, and the adapter 30 attached to the cutting machine body 10. The cutting machine body 10 includes the motor housing 20 accommodating the motor 25 and the handle 45 grippable by the user. The adapter 30 includes the body holder 30a attached to the cutting machine body 10 and the battery holder 32 in which the battery 40 to power the motor 25 is installable in a removable manner.

The adapter 30 is a component separate from the motor housing 20 and the handle 45. The cutting machine body 10 redesigned to change the output may be powered by the battery 40 having a different shape. In this case as well, another adapter 30 is simply designed to install various batteries with different sizes or shapes in the cutting machine body 10, without changing the design of the motor housing 20 and the handle 45. This reduces cost increase associated with production equipment caused by newly designing the cutting machine body 10.

The cutting machine 1 according to each of the above embodiments may be modified variously. For example, the adapter 30 may have a battery holder on its upper surface or right side in place of the battery holder 32 shown in FIG. 3. The adapter 30 may have a plurality of battery holders. For a positioning mechanism, for example, the motor housing 20 may have a recess into which a protrusion on the adapter 30 is fitted, in place of the rails 22a and the rail 31a shown in FIG. 25 that cooperate with each other. For example, the adapter 30 may be held on the motor housing 20 with an engagement tab to serve as a positioning mechanism.

The adapter 30 may include, for example, a recessed body holder, in place of the protruding body holder 30a shown in FIGS. 18, 29, and 31. For example, a protrusion on the stationary cover 12 protruding in the attaching direction (rightward) of the adapter 30 may be inserted in and fastened to the recessed body holder with a screw. In another example, the adapter 30 may be attached to the handle 45, and the handle 45 may be attached to the stationary cover 12. The stationary tool may be a table saw and a panel saw other than a sliding circular saw.

REFERENCE SIGNS LIST 1 cutting machine (stationary tool)
2 base
2a rotation support shaft
2e inner peripheral wall
3 auxiliary table
10 cutting machine body
10a vertical swing support shaft
11 cutting blade
12 stationary cover (cutting blade cover)
12a shaft hole
12b to 12e fastening screw
12f fastening screw
13 movable cover
14 fixing screw
15 outer flange
16 dust collection guide
20 motor housing
20a inlet
20b protrusion
20c screw hole
20d side surface
20e fastening screw
20g to 20j through-hole
21 blocking part (first ventilation part, positioning mechanism)
21a first ventilation hole
22 positioning unit
22a rail
25 motor
25a motor shaft
25b stator
25c rotor
25d sensor board
26 motor fan
30 adapter (first adapter)
30a body holder
30b screw hole
30g fastening screw
30c first surface
30d second surface
30e body engagement surface
30f bottom surface
31 positioning unit
31a rail
31b engagement part
31c flat surface
31d standing portion
31e extension
32 battery holder (first battery holder)
32a rail
33 ventilation part (second ventilation part, positioning mechanism)
33a second ventilation hole
33b cutout
34 lead wire
35 controller
36 right exhaust air window
37 left exhaust air window
38 terminal unit
38a terminal base
38b, 38c power terminal
38d signal terminal
40 battery
40a disengagement button
40b engagement tab
40c rail
40d connector terminal
41 communication adapter
45 handle
45a main handle
45b lock-off button
45c switch lever
45d carrying handle
45e switch (for a laser illuminator for guideline alignment)
45f switch (for turning on an illuminator)
46 right handle part
46a, 46b fitting hole
46c through-hole
47 left handle part
48 illuminator
49 laser illuminator
50 turntable
51 table body
52 outer peripheral table wall
53 table extension
53a screw hole
53b front support
53c rear support
54 throat plate
55 slot
56 positioning fence
56a positioning surface
57 adjustment bolt
58 miter scale plate
58a fixing screw
58b positioning recess
60 table positioning mechanism
61 grip
62 fixing rod
62a threaded shaft part
63 protection plate
65 positive locking mechanism
66 unlock lever
66a rear end
66b compression spring
66c operation part
66d swing shaft
67 positioning pin
67a rear end
68 engagement pin
69 operation knob
69a leaf spring
70 body support
70a lateral tilt support shaft
71 slide bar
80 fine angle adjuster
81 operation part 82 rotational shaft
83 first pinion
84 compression spring
85 reduction shaft (reduction mechanism)
85a pinion engagement gear
85b second pinion
86 rack
86a rack body
86b arc center axis
86c tooth
101 adapter (second adapter)
102 positioning unit
103 battery holder (second battery holder)
103a rail
105 battery (second battery)
105a disengagement button

What is claimed is:

1. A miter saw cutting machine for cutting a workpiece, comprising: a cutting machine body including a cutting blade, a motor configured to drive the cutting blade, and a motor housing accommodating the motor; and an adapter having a substantially box-shape and including a body engagement surface that is adjacent to a surface of the cutting machine body that is not a surface of the motor housing, a body holder that extends from the body engagement surface and is directly attached to a part of the cutting machine body other than the motor housing, a first surface substantially perpendicular to the body engagement surface and located at a first edge of the body engagement surface, a positioning unit that extends from the first surface and positions the adapter with respect to the motor housing, a second surface substantially parallel to the first surface and located at a second edge of the body engagement surface, the second edge being opposite the first edge, and a battery holder that extends from the second surface and to which a battery to power the motor is installable, wherein the adapter is oriented substantially parallel to the motor housing and the adapter and the motor housing are oriented at an acute angle to the cutting blade.

2. The cutting machine according to claim 1, wherein
the motor housing includes a first rail parallel to a longitudinal direction of the motor housing, and
the adapter is placed along the motor housing with the first rail.

3. The cutting machine according to claim 2, wherein the adapter includes
a controller configured to determine a voltage of the battery and control the motor, and
a terminal unit electrically connected to the motor through a lead wire.

4. The cutting machine according to claim 2, wherein
the motor housing includes a pair of first rails, and
the adapter includes a second rail to be fitted into the pair of the first rails with a clearance.

5. The cutting machine according to claim 4, wherein
the second rail has a T-shaped cross section, and
the second rail includes a standing portion arranged between the pair of the first rails.

6. The cutting machine according to claim 2, wherein
the adapter includes a pair of second rails parallel to a longitudinal direction of the adapter, and
the first rail is to be fitted into the pair of the second rails with a clearance.

7. The cutting machine according to claim 6, wherein
the first rail has a T-shaped cross section, and
the first rail includes a standing portion arranged between the pair of the second rails.

8. The cutting machine according to claim 1, wherein the adapter includes
a controller configured to determine a voltage of the battery and control the motor, and
a terminal unit electrically connected to the motor through a lead wire.

9. The cutting machine according to claim 1, wherein the motor housing includes
a motor fan rotatable by the motor to blow air for cooling the motor, and
a first ventilation hole through which the air blown by the motor fan passes, and the adapter has a second ventilation hole communicating with the first ventilation hole.

10. The cutting machine according to claim 9, wherein
the motor housing includes a first ventilation part having the first ventilation hole, and
the adapter includes the second ventilation hole and a second ventilation part into which the first ventilation part is fitted.

11. The cutting machine according to claim 10, wherein
the first ventilation part and the second ventilation part cooperate with each other to position the adapter with respect to the motor housing.

12. The cutting machine according to claim 1, wherein the cutting machine body includes
a cutting blade cover covering the cutting blade, and
a handle grippable by a user and including a right handle part and a left handle part that are combinable and horizontally symmetrical, and
the left handle part, the right handle part, the motor housing, and the adapter are fastened to
the cutting blade cover with a plurality of screws placed parallel to each other.

13. The cutting machine according to claim 1, wherein the adapter includes
a first adapter including a first battery holder in which a first battery with a first size is installable, and
a second adapter including a second battery holder in which a second battery with a second size is installable, and
the first adapter or the second adapter is selectively attachable to the cutting machine body.

14. The cutting machine according to claim 13, wherein
the first adapter includes the body holder attached to the cutting machine body, and
the second adapter includes a body holder with the same shape as the body holder of the first adapter.

15. The cutting machine according to claim 1, further comprising:
the battery.

16. The cutting machine according to claim 1, wherein
the cutting machine body includes a handle grippable by a user and including a right handle part and a left handle part that are combinable and horizontally symmetrical, and
the left handle part, the right handle part, the motor housing, and the adapter are integrated with a plurality of screws.

17. The cutting machine according to claim 16, wherein
the cutting machine body includes a cutting blade cover covering the cutting blade, and
the integrated four parts of the left handle part, the right handle part, the motor housing, and the adapter are attachable to the cutting blade cover.

18. The cutting machine according to claim 1, wherein the positioning unit is attachable to the motor housing.

19. A miter saw stationary tool placeable for use on a table or a floor, the miter saw stationary tool comprising a tool b: a base placeable on the table or the floor; a tool body supported on the base, the tool body including a cutting blade, the motor configured to drive the cutting blade, and a motor housing accommodating the motor; and an adapter having a substantially box-shape and attached to the tool body, the adapter including a body engagement surface that is adjacent to a surface of the tool blade that is not a surface of the motor housing, a body holder that extends from the body engagement surface and is directly attached to a part of the tool body other than the motor housing, a first surface substantially perpendicular to the body engagement surface and located at a first edge of the body engagement surface, a positioning unit that extends from the first surface and positions the adapter with respect to the motor housing, a second surface substantially parallel to the first surface, and located at a second edge of the body engagement surface, the second edge being opposite the first edge, a battery holder that extends from the second surface and to which a battery to power a motor is installable, wherein the adapter is oriented substantially parallel to the motor housing and the adapter and the motor housing are oriented at an acute angle to the cutting blade.

20. A miter saw cutting machine for cutting a workpiece, comprising: a cutting machine body including a cutting blade, a motor configured to drive the cutting blade, and a motor housing accommodating the motor; and an adapter having a substantially box-shape and including a body engagement surface that is adjacent to and faces a cutting machine body surface of the cutting machine body that is not a surface of the motor housing, a body holder that extends outwardly from the body engagement surface toward the cutting machine body surface and is directly attached to a part of the cutting machine body other than the motor housing, a first surface substantially perpendicular to the body engagement surface and located at a first edge of the body engagement surface, a positioning unit that extends outwardly from the first surface and engages the cutting machine body to position the adapter with respect to the motor housing, a second surface substantially parallel to the first surface and located at a second edge of the body engagement surface, the second edge being opposite the first edge, and a battery holder that extends from the second surface and to which a battery to power the motor is installable, wherein the adapter is oriented substantially parallel to the motor housing and the adapter and the motor housing are oriented at an acute angle to the cutting blade.

* * * * *